(12) United States Patent
Grocutt et al.

(10) Patent No.: US 9,292,036 B2
(45) Date of Patent: Mar. 22, 2016

(54) DATA PROCESSING APPARATUS AND METHOD FOR COMMUNICATING BETWEEN A MASTER DEVICE AND AN ASYNCHRONOUS SLAVE DEVICE VIA AN INTERFACE

(71) Applicant: ARM LIMITED, Cambridge (GB)

(72) Inventors: Thomas Christopher Grocutt, Impington (GB); Thomas Sean Houlihane, Bassingbourn (GB)

(73) Assignee: ARM Limited, Cambridge (GB)

( * ) Notice: Subject to any disclaimer, the term of this patent is extended or adjusted under 35 U.S.C. 154(b) by 315 days.

(21) Appl. No.: 13/901,771

(22) Filed: May 24, 2013

(65) Prior Publication Data

US 2014/0351359 A1     Nov. 27, 2014

(51) Int. Cl.
| G06F 15/16 | (2006.01) |
| G06F 1/12 | (2006.01) |
| H04L 12/40 | (2006.01) |
| G06F 13/42 | (2006.01) |

(52) U.S. Cl.
CPC .............. *G06F 1/12* (2013.01); *G06F 13/4282* (2013.01); *H04L 12/40019* (2013.01)

(58) Field of Classification Search
None
See application file for complete search history.

(56) References Cited

U.S. PATENT DOCUMENTS

| 6,574,225 B2 * | 6/2003 | Reynolds | H04J 3/0632 370/395.62 |
| 7,043,655 B2 * | 5/2006 | Wu | G06F 1/04 326/10 |
| 7,251,199 B2 * | 7/2007 | Eidson | G04G 5/00 368/46 |
| 7,274,751 B2 * | 9/2007 | Tarokh | H04L 1/0041 375/299 |
| 2003/0056136 A1 * | 3/2003 | Aweya | H03L 7/093 713/400 |
| 2003/0128720 A1 * | 7/2003 | Jones | H03L 7/07 370/516 |
| 2005/0091428 A1 | 4/2005 | Matsumoto et al. | |
| 2006/0056560 A1 * | 3/2006 | Aweya | H04J 3/0664 375/356 |

(Continued)

FOREIGN PATENT DOCUMENTS

| JP | 4326826 | 11/1992 |
| JP | 2010-128207 | 6/2010 |
| WO | WO 2012/118178 | 9/2012 |

OTHER PUBLICATIONS

ETSI TS 102 613 v7.7.0 (Oct. 2009), Technical Specification, Smart Cards; UICC—Contactless Front-end (CLF) Interface; Part 1: Physical and data link layer characteristics (Release 7), 58 pages.

(Continued)

*Primary Examiner* — Thomas Dailey
(74) *Attorney, Agent, or Firm* — Nixon & Vanderhye P.C.

(57) ABSTRACT

A data processing apparatus and method provide communication between a master device operating from a master clock signal and a slave device operating from a slave clock signal asynchronous to the master clock signal. An interface transfers packets between the master device and the slave device. A slave clock replica generator associated with the master device generates a slave clock replica that controls timing of transmission of packets by the master device over the interface. A sync request transfer is issued over the interface and has a property identifiable by the slave device irrespective of whether the sync request transfer is synchronized with the slave clock signal. In response, the slave device issues a sync response transfer indicative of at least a frequency of the slave clock signal, and the slave clock replica generator determines at least the frequency of the slave clock replica from that sync transfer.

20 Claims, 11 Drawing Sheets

(56) References Cited

U.S. PATENT DOCUMENTS

| | | | |
|---|---|---|---|
| 2006/0056563 A1* | 3/2006 | Aweya | H03D 13/002 375/376 |
| 2008/0151792 A1 | 6/2008 | Taich et al. | |
| 2010/0118894 A1* | 5/2010 | Aweya | G06F 1/0328 370/503 |
| 2011/0170645 A1 | 7/2011 | Barnette et al. | |
| 2013/0223458 A1* | 8/2013 | Bui | H04J 3/0658 370/503 |
| 2013/0336341 A1 | 12/2013 | Kamada | |

OTHER PUBLICATIONS

Intersil, ISL6296, Flexihash™ for Battery Authentication, Mar. 21, 2008, 19 pages.

[Online]—Wikipedia, 1-Wire, http://en.wikipedia.org/wiki/1-Wire, Apr. 24, 2013, 4 pages.

International Search Report and Written Opinion of the International Searching Authority dated Jun. 30, 2014 in PCT/GB2014/051362, 11 pages.

Microchip, 1K-16K UNI/O® Serial EEPROM Family Data Sheet, Microchip Technology, Inc., 2010, 44 pages.

* cited by examiner

DATA PROCESSING APPARATUS AND METHOD FOR COMMUNICATING BETWEEN A MASTER DEVICE AND AN ASYNCHRONOUS SLAVE DEVICE VIA AN INTERFACE

BACKGROUND OF THE INVENTION

1. Field of the Invention

The present invention relates to an apparatus and method for communicating between a master device and an asynchronous slave device via an interface. The asynchronous slave device is a slave device whose clock signal is asynchronous to the clock signal used by the master device.

2. Description of the Prior Art

There are many situations where the number of signals available for communication between a master device and a slave device is limited, and in such situations each multi-bit item of information has to be transmitted in at least a partially serial manner. Often the information is arranged into packets for transfer between the master device and the slave device, each packet comprising a plurality of bits. The master device initiates transactions, each transaction comprising a plurality of transfers including a master transfer to transmit a packet from the master device to the slave device and a slave transfer to transmit a packet from the slave device to the master device In such systems, the interface is often referred to as a serial interface since each multi-bit item of information is transmitted in at least a partially serial manner. Such a serial interface is also often referred to as a reduced pin count interface since there is not a separate pin provided for each bit of the multi-bit item of information to be transmitted. For example, if each item of information is 32-bits in size, such a serial interface will typically have significantly less than 32 pins, and indeed in some situations there will only be a single pin, such an interface being referred to as a single wire interface.

There are many situations where such serial interfaces are used, one example being in situations where the master device and the slave device reside on different chips, particularly in low cost devices where reduction in size of the interface is more important than overall performance. Such serial interfaces are also used to support ancillary functions such as debugging, where the cost and size of a parallel interface is typically prohibitive.

In situations where the clock signal of the slave device is asynchronous to the clock signal of the master device, this gives rise to an issue of how to synchronise the transfer of packets over the serial interface between the master device and the slave device. In some implementations, a separate pin can be provided for transmission of a clock signal between the master and slave devices. For example, it is known to provide a two wire debug interface, where one wire is used for the transfer of packets between the master device and the slave device, and the other wire is used for the transmission of a clock signal.

However, there is an increasing desire to reduce the pin count at the periphery of devices, and hence having to provide a separate wire for the transmission of the clock signal is undesirable.

A number of known solutions exist which avoid the need for a separate pin for transmission of a clock signal over a serial interface. One known technique is a "source synchronous" technique, as used for example for Ethernet, PCIe and SATA communication. In accordance with this technique, the transmitting side (which will be the master device for some transfers, and the slave device for other transfers) always uses its own clock and encodes the data of the packet in a way that guarantees regular data edges (for example by using Manchester encoding, 8B/10B). The receiving side then contains clock recovery logic that can reconstruct a replica of the original clock from these regular data edges, which is then used to sample the data provided in the packets. This can be done using phase locked loop (PLL) circuits or the like, which are large and expensive and often require an accurate reference clock. Another approach is to oversample the incoming data, but this requires a high speed clock on the receiving side which may not be available in all situations, and limits the maximum link speed over the interface.

Another known approach is a "timed" approach such as used in Universal Asynchronous Receive Transmit (UART) interfaces and IR remote controls. In accordance with such techniques, the bit periods have a fixed and predetermined width. The data can be encoded in number of ways, for example a high voltage may indicate a logic one value, whilst a low voltage indicates a logic zero value, with all bits having the same width. Alternatively, the signal over the interface may default to a low voltage level, and a logic one value is represented by a pulse of a predetermined width, with a logic zero value being represented by a pulse of a different, but also predetermined, width. However, because these types of protocol rely on fixed timings, they typically require a high speed clock of known frequency. They are also usually oversampled, which can limit the maximum link speed. Various examples of systems employing the "timed" approach include the Intersil system described in Intersil, ISL6296, Flexihash™ For Battery Authentication, Mar. 21, 2008, the "1-Wire" device communications system bus developed by Dallas Semiconductor Corp. and described in Wikipedia, 1-Wire, and the Single Wire Protocol (SWP) described in ETSI TS 102 613 v7.7.0 (2009-10), Technical Specification, "Smart Cards; UICC—Contactless Front-end (CLF) Interface; Part 1: Physical and data link layer characteristics (Release 7).

Another known approach is a "master synchronous" approach where all transmitted data is synchronous to the master device, including data transmitted by the slave device. To accomplish this, the protocol is designed such that the slave is given regular edges from the master device which it can use to infer what the master clock frequency is. A replica of the master clock is then created by the slave device and used to sample the incoming data, or to send response data back to the master device. Although the overall approach of creating a replica of the clock is similar to the source synchronous system mentioned above, a key difference here is that the complexity is biased to the slave side, thus enabling the master device to treat the interface as if it were synchronous to it. However, such an approach requires the slave device to have some form of PLL circuit and a high speed reference clock, or to limit the link speed and make use of oversampling techniques. An example of such a master synchronous system is described in the Microchip UNI/O specification, Microchip, 1K-16K UNI/O® Serial EEPROM Family Data Sheet, Microchip Technology, Inc., 2010. Some other master synchronous approaches are described in US2011/170645A, US2008/151792A and JP4326826A.

Whilst the master synchronous approach has a benefit over the source synchronous approach, in that the complexity required for synchronising the packets is limited to one side of the link, namely the slave side, there are many situations where it is not practical to support such complexity within the slave device. For example, in implementations such as debug interfaces, the available resources within the slave device/debug target are restricted (for example a high speed reference clock is often not available, and there is insufficient die area available to provide complex logic or PLLs).

Conceptually, a slave synchronous approach (effectively the opposite of the master synchronous approach described above) would appear to be an attractive technique for overcoming the complexity limitations within the slave device. In accordance with such an approach, the slave device would treat the interface as if it were synchronous to its clock, and the master device would then create a replica of the slave clock which it uses to sample incoming data from the slave device and to transmit data to the slave device. However a problem that arises is that each transaction (involving at least one transfer from the master device to the slave device, and at least one transfer from the slave device to the master device) is initiated by the master device, and since the transaction is initiated by the master device the master device needs to have sufficient information about the slave clock at the time the transaction is initiated. Hence, a mechanism needs to be provided to enable the master device to get such information about the slave clock, and that mechanism cannot itself require a transaction to be issued that relies on the replica clock maintained by the master being an accurate representation of the slave's clock.

One way to seek to provide such a slave synchronous technique is described in US 2005/0091428. In accordance with the technique described in that patent application, prior to every data transaction the master unit sends a start signal to the slave unit, and in response to that start signal the slave unit sends to the master unit a synchronisation field that is a data train (pulse signal) indicative of the slave unit's transfer clock. The master unit then uses this sample to send command data to the slave unit in accordance with the transfer clock as indicated by the synchronisation field sent from the slave unit. In response to the command data, the slave unit then sends to the master unit response data in accordance with the transfer clock indicated by the synchronisation field. One problem with this approach is that it is necessary to send a sample of the slave clock prior to every transaction. As a result, this sample has to be kept relatively short in order to reduce the overhead of the described protocol. However, as a result of keeping the sample relatively short, this adversely affects the accuracy with which the master device can create a replica of the slave unit's clock, and even when the sample is kept relatively short it still represents an overhead associated with every transaction.

Accordingly, it would be desirable to provide an improved mechanism for communicating over an interface between a master device and an asynchronous slave device, which enables the complexity of the slave device to be reduced, whilst still allowing relatively high data rates to be achieved when transmitting data over the interface.

SUMMARY OF THE INVENTION

Viewed from a first aspect, the present invention provides a data processing apparatus comprising: a master device configured to operate from a master clock signal; a slave device configured to operate from a slave clock signal asynchronous to said master clock signal; an interface between said master device and said slave device, the interface providing a communication path for the transfer of packets between the master device and the slave device, each packet comprising a plurality of bits; the master device being configured to initiate transactions, each transaction comprising a plurality of transfers including a master transfer to transmit a packet from the master device to the slave device and a slave transfer to transmit a packet from the slave device to the master device; the master device including a slave clock replica generator configured to generate a slave clock replica used to control timing of transmission of packets by the master device over the interface, and to control timing of reception by the master device of packets sent by the slave device over the interface; the master device including control circuitry configured in response to a predetermined trigger condition to cause a sync request transfer to be issued over said interface from the master device to the slave device, the sync request transfer having a property identifiable by the slave device irrespective of whether the sync request transfer is synchronised with the slave clock signal; the slave device being responsive to detection of said sync request transfer to issue over said interface a sync response transfer indicative of at least a frequency of the slave clock signal; the slave clock replica generator being configured to determine at least the frequency of the slave clock replica from said sync response transfer; and the slave clock replica generator further being configured to reference at least a portion of the packet of selected slave transfers to determine a phase of the slave clock replica, said at least a portion of the packet containing at least one transition between a first value and a second value different to said first value; whereby the determination of the phase of the slave clock replica is decoupled from the determination of the frequency of the slave clock replica.

In accordance with the present invention, the master device includes a slave clock replica generator configured to generate a slave clock replica used to control timing of transmission of packets by the master device over the interface, and to control timing of reception by the master device of packets sent by the slave device over the interface. In response to a predetermined trigger condition, the master device issues a sync request transfer over the interface, the sync request transfer having a property which makes it identifiable by the slave device irrespective of whether the sync request transfer is synchronised with the slave clock signal. In response to a such a sync request transfer, the slave device issues over the interface a sync response transfer, and the slave clock replica generator within the master device determines at least a frequency of the slave clock replica from the sync response transfer. Whilst in some embodiments the slave clock replica generator can also be configured to determine a phase of the slave clock replica from the sync response transfer, an additional mechanism is provided to allow the slave clock replica generator to determine the phase of the slave clock replica, thereby decoupling such determination of the phase from determination of the frequency. In particular, the slave clock replica generator is configured to determine a phase of the slave clock replica from at least a portion of the packet of selected slave transfers occurring in response to the transactions initiated by the master device. The relevant portion of the packet is arranged so that it contains at least one transition between a first value and a second value different to the first value, thereby ensuring that there is at least one edge that the slave clock replica generator can locate in order to determine the phase of the slave clock replica.

Since in accordance with the present invention the determination of the phase of the slave clock replica is decoupled from the determination of the frequency of the slave clock replica, this allows for the regular update of the phase of the slave clock replica, and independent of any sync request transfers being issued. Hence, the trigger condition can be set in order to detect situations where it is appropriate to reevaluate the frequency of the slave device's clock. Typically, the slave device's clock frequency will vary relatively infrequently and/or relatively slowly. Accordingly, the need for issuance of a sync request transfer is likely to occur relatively infrequently. As a result, the overhead associated with the issuance of such sync request transfers is relatively minor, and accordingly the associated sync response transfer can occupy a period of time sufficient to provide an accurate indication of the slave clock signal. However, in addition, by decoupling the determination of the phase of the slave clock replica from the determination of the frequency of the slave clock replica, frequent updates to the phase can be detected, allowing the slave clock replica maintained by the master device to track with variations in the phase of the slave clock signal.

The predetermined trigger condition can take a variety of forms, but in one embodiment the predetermined trigger condition is set such that, aggregated over time, the slave clock replica generator receives said selected slave transfers more frequently than said sync response transfers.

Such an approach enables the complexity of the slave device to be reduced, by providing the master device with a reliable mechanism for generating a slave clock replica used to control timing of its transmission of packets over the interface and its reception of packets sent by the slave device over the interface. Further, the approach of the present invention reduces the overhead associated in maintaining the slave clock replica, and accordingly allows high data rates to be achieved when transmitting data over the interface.

The selected slave transfers referenced by the slave clock replica generator can take a variety of forms, but in one embodiment they comprise at least one slave transfer of each transaction. In one particular embodiment, the selected slave transfers can comprise every slave transfer.

There are a number of ways in which the sync request transfer can be provided with a property that is identifiable by the slave device irrespective of whether the sync request transfer is synchronised with the slave clock signal. In one embodiment, that property comprises assertion of said sync request transfer at a fixed value for a duration exceeding a maximum duration that is allowable within a packet of a master transfer. Hence, when the slave device observes the presence of the fixed value for a duration exceeding that maximum allowable duration, it recognises that signal as a sync request transfer. Further, such a property will be observed by the slave device irrespective of the timing of the sync request transfer, and hence the master device does not need to have a reliable slave clock replica at the time the sync request transfer is issued.

The above-mentioned maximum duration can be determined in a variety of ways, but in one embodiment it is determined with reference to a predetermined maximum packet size of a master transfer and a predetermined minimum clock frequency for the slave clock signal. By such an approach, it can be ensured that, whatever clock frequency the slave device is operating at (as long as it is at the predetermined minimum clock frequency or higher), the slave device will observe the fixed value for a duration exceeding the above-mentioned maximum duration, and hence will reliably identify the presence of the sync request transfer.

The portion of the packet of selected slave transfers that is referenced by the slave clock replica generator can take a variety of forms. In one embodiment, that portion comprises a multi-bit response, and the slave device is configured to generate said multi-bit response to always include a transition between the first value and the second value. The transition between the first value and the second value can be in either direction, and provided that there is always guaranteed to be at least one such transition within the portion of the packet of each selected slave transfer, then the slave clock replica generator can use the timing of that transition to update the phase of the slave clock replica.

The multi-bit response can take a variety of forms. However, in one embodiment, the slave device is configured to set the multi-bit response such that the master device can determine whether the slave device correctly received a master transfer. The master device is then responsive to detection of the multi-bit response indicating incorrect reception of the master transfer by the slave device to resend the associated master transfer with its timing of transmission determined in accordance with the slave clock replica as updated by the phase determined by the slave clock replica generator from the incorrect reception indicating multi-bit response. Hence, by ensuring that the multi-bit response enables the master device to determine whether the slave device correctly received a master transfer, this mechanism can be used to cause a resend of the transfer as needed, and when resending the transfer the updated phase (as detected from the multi-bit response) can be used to adjust the phase of the slave clock replica and hence the timing of the issuance of that master transfer. By adjusting the phase in response to the multi-bit response, this will improve the probability of the slave device correctly receiving the master transfer when it is present.

By such an approach, when the interface is heavily loaded the synchronisation overheads further diminish, as the high levels of traffic over the interface provide many occurrences of the selected slave transfers that are used by the slave clock replica generator to adjust the phase of the slave clock replica There are various ways in which the multi-bit response can be configured so as to identify to the master device whether the slave device correctly received the master transfer. For example, in one embodiment the multi-bit response can take the form of a multi-bit acknowledgement signal, with the direction of the transition between the first value and the second value identifying whether the master transfer was correctly received or not. Irrespective of the direction of the transition, the presence of the transition within the multi-bit response enables the phase of the slave clock replica to be adjusted, and then if the transition is in the direction indicating that the master transfer has not been correctly received, that master transfer can be re-sent based on the timing of the updated slave clock replica.

There are many ways in which the slave device can be arranged to determine if it has correctly received the master transfer or not, so as to then encode that information within the multi-bit response. For example, the slave device can use a cyclic redundancy check (CRC) mechanism, parity mechanism or any other suitable forms of error detection in order to determine whether the master transfer has been correctly received or not.

In one embodiment, the slave device may be unable to modify the frequency of its slave clock signal, such that any variations in the frequency will typically result from operating conditions such as a change in temperature of the slave device, or a change in voltage provided to the slave device. However, in an alternative embodiment the slave device further comprises clock modification circuitry configured to modify the frequency of the slave clock signal in response to a modification command issued by the master device. Hence, in such embodiments, the master device can seek to vary the frequency of the slave clock signal, this providing a mechanism for increasing the frequency of the transfers occurring over the interface in situations where the link quality is perceived to be good, and accordingly a higher transfer speed can be accommodated. Hence, such an approach significantly improves flexibility, by allowing the link frequency to be adapted to the quality of the slave clock, for example enabling higher bandwidths across the interface when the slave clock has a low jitter, but whilst allowing the mechanism to fall back to lower link speeds when the quality of the slave clock is poor.

There are a number of mechanisms by which the master device can communicate with the clock modification circuitry. In one embodiment, the slave device further comprises a control register whose stored value is referenced by the clock modification circuitry to determine the frequency of the slave clock signal, and the master device is configured to issue the modification command by initiating a write transaction over the interface to write an updated value into the control register. Hence, when an updated value is written into the control register, this will cause the clock modification circuitry to make any necessary adjustment to the frequency of the slave clock signal.

Further, in one embodiment, the slave device is responsive to the modification command to issue over the interface a sync response transfer indicative of the updated slave clock signal. Hence, whenever the modification command is issued, this will result in a sync response transfer being returned indicative of the updated slave clock signal. Hence, it can be seen that in such embodiments the use of the modification command provides an additional mechanism for obtaining a sync response transfer, in addition to the sync request transfer that is issued upon occurrence of the earlier-mentioned predetermined trigger condition.

In one embodiment, the updated value written into the control register by the modification command is not required to actually be a different value to the current value stored in the control register. In particular, in some instances it is useful to issue a modification command merely as a mechanism to get a sync response transfer from the slave device. This can be achieved by writing into the control register the same value as is currently stored therein, this causing the slave device to issue a sync response transfer indicative of the (updated) slave clock signal. In this particular instance, there will have been no adjustment made to the slave clock signal, and hence the sync response transfer merely identifies to the master device an indication of the current frequency of the slave clock signal.

Whilst the earlier-mentioned clock frequency adjustment mechanism significantly improves flexibility, for example by allowing the speed of the interface to be adjusted to provide higher bandwidth communication across the interface when the slave clock has a low jitter, it is useful to provide a mechanism for backtracking from any increased frequency in certain situations, for example where the increased frequency has resulted in a significant increase in the number of errors observed over the interface. In one embodiment, such a mechanism can be elegantly introduced by modifying how the slave device responds to the sync request transfer. In particular, in one embodiment, the slave device is configured to be responsive to detection of the sync request transfer to lower the frequency of the slave clock signal prior to issuing over the interface a sync response transfer indicative of that lowered frequency slave clock signal.

Hence, in such an embodiment, the predetermined trigger condition can be arranged to include some measure of link quality, for example a measure of bit error rate across the interface. Then, if the bit error rate increases beyond a predetermined level, which may for example arise due to the frequency of the slave clock signal having been increased to a point where a significant increase in the number of errors in the packets being transferred across the interface occurs, this will cause the issuance of a sync request transfer, and the slave device will respond to that sync request transfer by lowering the frequency of the slave clock signal, and then issuing the sync response transfer indicative of the lowered frequency slave clock signal.

There are a number of ways in which the frequency can be lowered. For example, in one embodiment, it can immediately be adjusted back to the minimum slave clock signal frequency. Alternatively, the frequency may be lowered in stages, so that one or more iterations of issuance of the sync request transfer can be used to lower the frequency of the slave clock signal back to a level where the bit error rate is within a tolerable range. Further, in embodiments where there is a predetermined minimum slave clock frequency, the slave device will not lower the frequency below that predetermined minimum frequency in response to the sync request transfer.

The sync response transfer (whether issued in response to the sync request transfer or in response to the modification command) can be configured in a variety of ways. However, in one embodiment, the slave device is configured to generate the sync response transfer to comprise a series of edge transitions within a selected number of slave clock cycles, the number of edge transitions in said series being less than said selected number of slave clock cycles. The slave clock replica generator is then configured to apply a derivation operation to determine the frequency of the slave clock replica from the sync response transfer. By such an approach, it is possible to reduce the complexity of the components provided within the master device to derive the slave clock replica. For example, whilst the master side of the interface could be implemented in hardware (for example by using a field programmable gate array (FPGA)), it is also possible to produce a low cost, low performance master device by using oversampling techniques in software (running on another microcontroller). By reducing the number of edge transitions within the sync response transfer (when compared with an alternative form of sync response transfer that directly identifies each slave clock cycle), this makes it easier for such a master device to lock onto the slave clock.

There are a number of ways in which such a sync response transfer having a reduced number of edge transitions can be provided. For example, in one embodiment the sync response transfer comprises at least two edge transitions. For example, a first transition from a first value to a second value may occur on occurrence of a first slave clock cycle, with a further transition from the second value back to the first value then occurring on occurrence of a slave clock cycle a predetermined number of slave clock cycles after the first slave clock cycle. Provided the slave clock replica generator knows the predetermined number of slave clock cycles taking place between these edges, then via the derivation operation it can determine the frequency of the slave clock replica. It could also additionally determine the phase of the slave clock replica if desired.

In one embodiment, the sync response transfer comprises four edge transitions formed as a start pulse and an end pulse, and the slave device is configured to issue the end pulse a predetermined number of clock cycles of the slave clock signal after the start pulse is issued. Again, the derivation operation performed by the slave clock replica generator will operate in a similar manner, by detecting the start pulse and the end pulse, and inferring the slave clock frequency from the time between the start pulse and end pulse, and the knowledge of the predetermined number of clock cycles of the slave clock signal that will have taken place between the slave device issuing the start pulse and the slave device issuing the end pulse.

As discussed earlier, by reducing the number of edge transitions in the sync response transfer, this reduces the complexity of the mechanism needed within the master device (whether that be a hardware mechanism or a software mechanism) to detect the frequency of the slave clock signal from the sync response transfer.

In one particular embodiment based on the use of a hardware microcontroller, such microcontrollers typically include time stamping hardware on their general purpose input/output (GPIO) interface to accurately capture edge transitions. When using the above start and end pulse approach, the master device may use that pre-existing time stamping circuitry to record when the start pulse is received by the master device and subsequently to record when the end pulse is received by the master device. Due to the relatively long gap between the start pulse and the end pulse, the master device has ample time to read out the captured timing of the start pulse before it is overwritten in the time stamping circuitry by the time of the end pulse, and hence the pre-existing time stamping circuitry can be used to obtain both the time of the start pulse and the time of the end pulse. This same time stamping circuitry could also be used in other embodiments, for example the embodiment described above where a first transition from a first value to a second value occurs on occurrence of a first slave clock cycle, with a further transition from the second value back to the first value then occurs on occurrence of a slave clock cycle a predetermined number of slave clock cycles after the first slave clock cycle.

Typically, a signal issued by the slave device over the interface in accordance with its slave clock signal will be delayed by the output pad in the slave device, the wire or wires that interconnect the slave device and the master device, and the input pad on the master device, and as such the edge transition detected by the slave clock replica generator in order to determine the phase of the slave clock signal will not be an accurate representation of the phase of the slave's internal clock. In some instances, for example where the slave clock frequency is relatively low, and the above-mentioned delays are very small, the effect of those delays will be negligible, and accordingly it is not necessary to take account of those delays. In other instances, the delays may be predictable and fairly static, and as such a predetermined offset can be applied by the slave clock replica generator to the phase that it determines from the selected slave transfers (or indeed from the sync response transfer if the sync response transfer is also used to determine a phase of the slave clock signal).

However, in situations where the delay is likely to have a significant effect, and may vary sufficiently that a predetermined offset cannot be applied, in one embodiment the transmission protocol between the master device and the slave device can be enhanced by the inclusion of an echo feature. In particular, in accordance with the echo feature, the control circuitry is configured, in response to a predetermined echo trigger condition, to cause the master device to initiate an echo event, where a master transfer issued by the master device comprises a bit sequence, and the slave device is configured to return as the slave transfer a copy of that bit sequence as sampled by the slave device in accordance with the slave clock signal. Hence, this provides a mechanism for the master device to determine how accurately the slave device receives the bit sequence that it transmits. The echo event can be arranged in a variety of forms. For example, it could be constructed as a single transaction that causes the bit sequence to be sent to the slave, and the slave to immediately return the sampled version of that bit sequence. Alternatively, the echo event could be arranged as a pair of transactions, for example by a write transaction to write the bit sequence into a register of the slave, followed by a read transaction that reads the data from that register and returns it to the master device.

Further, there is no requirement for the bit sequence to be a predetermined, constant, bit sequence, and in one embodiment the echo event could be repeated for several different bit sequences, since different sequences will be prone to different errors.

In one embodiment, on occurrence of the echo trigger condition, the echo event is repeated for each of a plurality of candidate phase values for the slave clock replica, and the slave clock replica generator is configured to determine a phase indication to be used when determining the slave clock replica for future transactions based on an indication of which candidates phase values result in the copy of the bit sequence as returned by the slave device not matching the bit sequence transmitted from the master device. Hence, by looking at the clock phases where errors are generated in the bit sequence as returned by the slave device, the master device can get a more accurate estimate of the phase of the slave device's internal clock than would otherwise be possible if the master device just relied upon the location of the edge transitions in signals received by the master device from the slave device over the interface. For example, a midpoint between the phases where errors are generated can be determined, and comparison of that midpoint with the phase as detected by the slave clock replica generator from the selected slave transfers can be used to identify a phase offset.

Hence, in one embodiment the phase indication comprises a phase offset to be applied to the phase determined by the slave clock replica generator with reference to said at least a portion of the packet of selected slave transfers of subsequent transactions.

Whilst the above described mechanism may be used to configure an interface between the master device and a single slave device, in an alternative embodiment the same basic approach can be used to configure communication between the master device and a plurality of slave devices. In particular, in one embodiment the data processing apparatus further comprises a plurality of slave devices, said plurality including said slave device, and the master device being switchable to communicate with any of said plurality of slave devices via said interface, said interface providing a separate communication path between the master device and each slave device in said plurality. When the master device is to switch from communicating with a first slave device in said plurality to communicating with a second slave device in said plurality, the control circuitry is configured to cause at least the frequency of the slave clock replica currently used by the slave clock replica generator to be stored for subsequent reference when the master device switches back to communicating with that first slave device. By storing at least the frequency of the slave clock replica currently being used by the slave clock replica generator prior to switching communication between a first slave device and a second slave device, this provides a good starting point for communication when the master device subsequently switches back to the first slave device. In particular, the frequency of the slave clock replica is likely to vary very slowly, and accordingly the stored frequency is likely to provide a good approximation of the frequency to use when returning to communication with the first slave device. Whilst the phase may have altered significantly in the meantime, a better approximation of the phase can be determined after the first master transfer has been issued from the master device to the first slave device following resumption of communication with the first slave device, since if the phase is incorrect, the multi-bit response is likely to identify that the slave device has not correctly received the master transfer. Nevertheless, that multi-bit response can be used to determine a better estimate for the phase, allowing the master transfer to be retried using the improved estimate of the phase.

In embodiments using the earlier described echo feature, any calculated phase offset may also be stored in addition to the frequency when switching between slave devices, as the phase offset is also likely to vary very slowly, for example due to changes in temperature of the apparatus, and accordingly a stored phase offset is likely to provide a good initial estimate to use when resumption of communication with the first slave device takes place.

Whilst in one embodiment, when the master device communicates with a plurality of slave devices, there can be considered to be a single interface between the master device and those slave devices, with the interface providing separate communication paths between the master device and each slave device, alternatively such a configuration can be viewed as providing a separate interface between the master device and each slave device, but the above described mechanism for storing the frequency (and optionally the phase offset) of the slave clock replica each time there is a switch between the master device and a different slave device can be still be used in an identical manner.

Viewed from a second aspect, the present invention provides a method of operating a data processing apparatus comprising a master device operating from a master clock signal, a slave device operating from a slave clock signal asynchronous to said master clock signal, and an interface between said master device and said slave device, the interface providing a communication path for the transfer of packets between the master device and the slave device, each packet comprising a plurality of bits, the method comprising: initiating transactions from the master device, each transaction comprising a plurality of transfers including a master transfer to transmit a packet from the master device to the slave device and a slave transfer to transmit a packet from the slave device to the master device; employing a slave clock replica generator to generate a slave clock replica used to control timing of transmission of packets by the master device over the interface, and to control timing of reception by the master device of packets sent by the slave device over the interface; in response to a predetermined trigger condition, issuing a sync request transfer over said interface from the master device to the slave device, the sync request transfer having a property identifiable by the slave device irrespective of whether the sync request transfer is synchronised with the slave clock signal; responsive to detection of said sync request transfer by the slave device, issuing over said interface to the master device a sync response transfer indicative of at least a frequency of the slave clock signal; determining within the slave clock replica generator at least the frequency of the slave clock replica from said sync response transfer; and referencing at least a portion of the packet of selected slave transfers to determine within the slave clock replica generator a phase of the slave clock replica, said at least a portion of the packet containing at least one transition between a first value and a second value different to said first value; whereby the determination of the phase of the slave clock replica is decoupled from the determination of the frequency of the slave clock replica.

Viewed from a third aspect, the present invention provides a data processing apparatus comprising: master means for operating from a master clock signal; slave means for operating from a slave clock signal asynchronous to said master clock signal; interface means between said master means and said slave means, the interface means for providing a communication path for the transfer of packets between the master means and the slave means, each packet comprising a plurality of bits; the master means for initiating transactions, each transaction comprising a plurality of transfers including a master transfer to transmit a packet from the master means to the slave means and a slave transfer to transmit a packet from the slave means to the master means; the master means including a slave clock replica generator means for generating a slave clock replica used to control timing of transmission of packets by the master means over the interface means, and to control timing of reception by the master means of packets sent by the slave means over the interface means; the master means including control means, responsive to a predetermined trigger condition, for causing a sync request transfer to be issued over said interface means from the master means to the slave means, the sync request transfer having a property identifiable by the slave means irrespective of whether the sync request transfer is synchronised with the slave clock signal; the slave means, responsive to detection of said sync request transfer, for issuing over said interface means a sync response transfer indicative of at least a frequency of the slave clock signal; the slave clock replica generator means for determining at least the frequency of the slave clock replica from said sync response transfer; and the slave clock replica generator means further for referencing at least a portion of the packet of selected slave transfers to determine a phase of the slave clock replica, said at least a portion of the packet containing at least one transition between a first value and a second value different to said first value; whereby the determination of the phase of the slave clock replica is decoupled from the determination of the frequency of the slave clock replica.

BRIEF DESCRIPTION OF THE DRAWINGS

The present invention will be described further, by way of example only, with reference to embodiments as illustrated in the accompanying drawings, in which.

DESCRIPTION OF EMBODIMENTS

Figure 1:
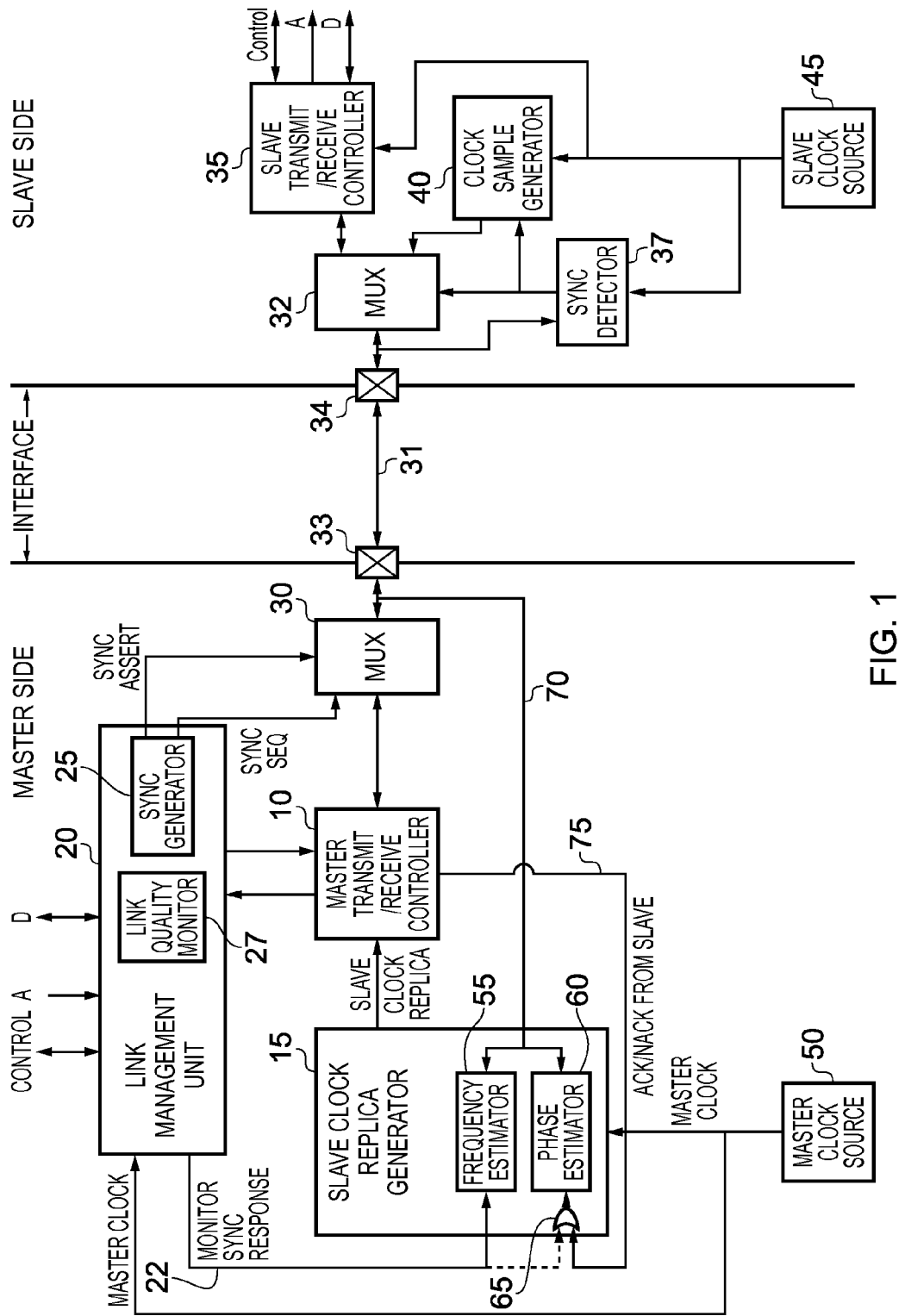
FIG. 1 is a block diagram of a data processing apparatus in accordance with one embodiment.

FIG. 1 is a block diagram of a data processing apparatus in accordance with one embodiment. As shown, a master device is connected with a slave device via a serial interface. In this particular example, the interface is a single wire interface, with the wire extending between a master pin 33 and a slave pin 34 to form a communication path 31 over the interface for the transfer of packets between the master device and the slave device in either direction, each packet comprising a plurality of bits. Transactions are initiated by the master device using the link management unit 20, each transaction comprising a plurality of transfers including at least one master transfer to transmit a packet from the master device to the slave device and at least one slave transfer to transmit a packet from the slave device to the master device.

As shown, the link management unit 20 will receive control signals from elsewhere in the master, or from an external port, to identify the transactions to be issued by the master device. For each transaction, an address (A) will be specified, and for write transactions the data (D) to be written to that address will also be specified. For read transactions, the data will be returned from the slave device by performing a read operation to the address specified by the transaction. In addition, various control data will be generated in one or both directions.

For each transaction, the link management unit 20 will communicate with the master transmit/receive controller 10 to cause a master transfer to be constructed for issuing via the multiplexer 30 to the master pin 33 for communication over the communication path 31 to the slave pin 34 of the slave device, from where that transfer will be routed via the multiplexer 32 to the slave transmit/receive controller 35. The first master transfer will typically specify the address for the transaction, and may optionally include one or more items of control information. This information can be constructed into a packet by the master transmit/receive controller 10 for outputting in a serial fashion over the communication path 31.

For a write transaction, the packet may also identify the write data to be written at the address, or alternatively this can be sent as an additional packet/master transfer. The slave transmit/receive controller 35 will extract the control and address information from the master transfer, and the data in the event of a write transaction taking place, and will then route the necessary signals on to the entity to be accessed in order to process the transaction.

For a read transaction, accessing of the entity identified by the address will result in data being returned to the slave transmit/receive controller 35 for outputting as a slave transfer over the interface back to the master device. In particular, that read data will be constructed into at least one packet by the slave transmit/receive controller 35, and when the communication path 31 is available to transmit that data, it will be returned over the communication path 31, where it will be received by the master transmit/receive controller 10, and the read data will then be returned via the link management unit 20 for output over the data path from the link management unit.

In accordance with the described embodiment, components within the master device will generally be operated under the control of a master clock source 50 providing a master clock signal. Similarly, components within the slave device will generally be driven under the control of a slave clock source 45 providing a slave clock signal that is asynchronous to the master clock signal. In accordance with the described embodiment, the timing of transmission of information over the interface is controlled in accordance with the slave clock signal, and accordingly it is necessary for the master device to construct a slave clock replica which is then used to control the operation of the master transmit/receive controller 10. In particular, the slave clock replica will control the timing of transmission of packets by the controller 10 over the interface, and will also control timing of reception by the controller 10 of packets sent by the slave device over the interface.

To achieve this, the master device includes slave clock replica generator circuitry 15 which is driven by the master clock signal produced by the master clock source 50, but generates a slave clock replica used to control operation of the master transmit/receive controller 10. As shown, the link management unit 20 is also driven by the master clock signal from the master clock source 50. However, there is no requirement to operate the link management unit 20 at exactly the same frequency as the slave clock replica generator 15, and if desired a clock divider circuit could be placed between the master clock source 50 and the link management unit 20 to selectively run the link management unit 20 at a slower speed than the slave clock replica generator 15.

On occurrence of a predetermined trigger condition, the link management unit 20 will cause the sync generator 25 to generate a sync assert signal to the multiplexer 30 to switch the input of the multiplexer from the controller 10 to the sync generator 25. At that point, the sync generator 25 will also output a sync request transfer (also referred to herein as a sync sequence), which is issued over the communication path 31 to the slave device. The sync sequence has a property which is identifiable by the slave device irrespective of whether that sync sequence is synchronised with the slave clock signal or not, and accordingly a sync detector 37 within the slave device will detect transmission of the sync sequence over the interface.

There are a number of ways in which the sync sequence can be arranged to be identifiable by the slave device irrespective of its timing of transmission. In one embodiment, if the idle state of the wire forming the communication path 31 is defined as being in a logic low state, and the communication protocol defines a maximum transaction length for normal transactions initiated by the master device, then this defines a maximum number of clock cycles that the wire could normally be in a logic high state for (for example if the transaction contained all logic one values). If a minimum clock frequency is defined for the slave device, then this maximum number of cycles the wire can be at a logic high state for can be translated into a maximum amount of time the wire could be at a logic one state for during a master transfer of a normal transaction. This property then allows the sync generator 25 to send a sync sequence to the slave by simply driving the wire to the logic high state for a period of time longer than would be allowed for a normal transaction.

The sync detector 37 can then detect this property, and when the wire returns to the logic low state, it will then issue a control signal to the multiplexer 32 to cause it to select the output from the clock sample generator 40. In addition, the sync detector 37 will send a control signal to the clock sample generator 40 to cause the clock sample generator to generate a sync response transfer which is indicative of the slave clock signal. As will be discussed later with reference to FIG. 7, this sync response transfer can take a variety of forms, but will provide sufficient information to enable the slave clock replica generator 15 within the master device to determine a current frequency of the slave clock signal. In particular, the slave clock replica generator 15 includes a frequency estimator 55 which is configured to receive communications between the master pin 33 and the multiplexer 30. Normally, the frequency estimator does not monitor the information on that path, but once the sync generator 25 has issued the sync sequence, the link management unit 20 then issues a signal over path 22 to the frequency estimator 55 to cause it to monitor the sync response subsequently output from the clock sample generator 40. Optionally, as shown by the dotted line input to the OR gate 65, this same signal from the link management unit can be used to cause phase estimator circuitry 60 within the slave clock replica generator 15 to monitor the sync response transfer in order to determine a current phase of the slave clock. Collectively, the frequency and phase estimates produced by the frequency estimator and phase estimator are used to generate the slave clock replica used to control the master transmit/receive controller 10.

In practice, the frequency of the slave clock signal varies only slowly based on operating conditions such as operating temperature of the slave device, fluctuations in voltage supply to the slave device, etc, and accordingly the frequency estimation only needs to be performed relatively infrequently. For example, in one embodiment, such a frequency estimation may be needed when the system is booted up, and periodically following elapse of a predetermined time since the last frequency estimation was made. In addition, if a link quality monitor 27 is provided within the link management unit, the link quality monitor can be used to monitor the quality of the link across the interface, by measurement of factors indicative of that quality, such as a bit error rate observed over the communication path 31. If the bit error rate increases beyond a predetermined threshold, this may indicate that the current frequency estimate being used to generate the slave clock replica differs significantly from the actual frequency of the slave clock signal, and hence can be used to trigger the regeneration of a sync sequence by the sync generator 25.

Figure 3:
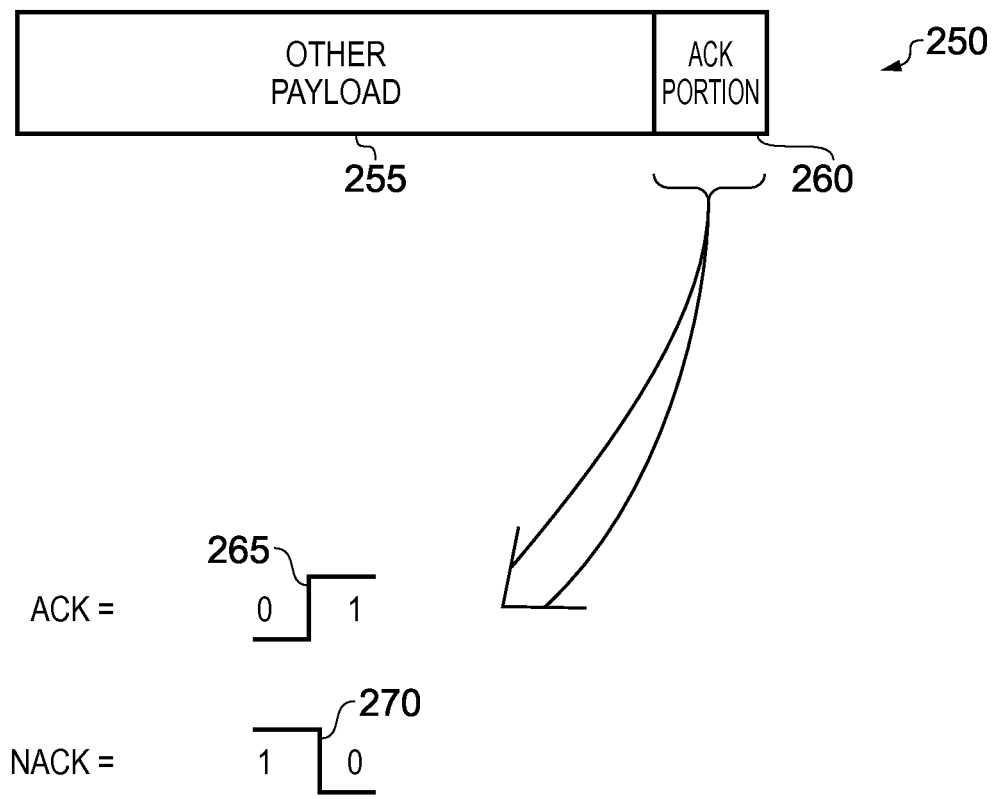
FIG. 3 schematically illustrates how a multi-bit acknowledgement signal is used in one embodiment to update the phase of the slave clock replica.

Whilst the frequency is likely to vary only relatively slowly, the phase of the slave clock signal with respect to the master clock source 50 is likely to vary over a much shorter time frame, and any inaccuracies in the phase used for the slave clock replica may result in master transfers not being received correctly by the slave device and/or the master device not correctly reading slave transfers issued by the slave device. In accordance with the described embodiment, this issue is addressed by providing a separate mechanism for causing the slave estimator 60 to re-evaluate the phase of the slave clock. In particular, during the handling of normal transactions, at least a portion of the packet of selected slave transfers received by the master transmit/receive controller 10 are used to trigger the slave estimator 60 to re-evaluate the phase of the slave clock. The portion of the packet of selected slave transfers used for this purpose can vary dependent on implementation, provided it can be guaranteed that that portion will contain at least one transition between a first value and a second, different, value. In one embodiment, the slave device is arranged to output as at least part of a packet a multi-bit response which has this property. In one particular embodiment, the multi-bit response forms an acknowledgement portion as shown for example in FIG. 3. As shown in FIG. 3, the packet 250 of a slave transfer includes an acknowledgement portion 260, and may optionally include some other payload information 255. It should be noted that for certain slave transfers, there may not be any other payload. For example, in response to a write transfer, the slave device may issue a slave transfer that only contains the acknowledgement signal.

Each time the master transmit/receive controller 10 expects to receive such an acknowledgement signal 260, it notifies the phase estimator 60 over path 75, whereafter the phase estimator 60 receives the acknowledgement signal over path 70 and identifies the position of the edge transition in order to update the phase estimate.

By such an approach, the determination of the phase of the slave clock replica is decoupled from the determination of the frequency of the slave clock replica. This enables frequent phase estimations to be made using the slave transfers of standard transactions, with the frequency estimation only being performed as often as necessary to ensure a reliable communication. This means that the sync generator only needs to use the interface relatively infrequently, and hence does not impact adversely the bandwidth available for processing normal transactions. Further, because the synchronisation sequence only needs to be issued relatively infrequently, when it is issued the clock sample generator 40 can generate a relatively long sync response transfer without adversely affecting performance, and by issuing a long sync response transfer this enables the frequency estimator 55 to determine a more accurate frequency estimate of the slave clock. Between each such sync process, the phase estimator can continue to adjust the phase based on the slave transfers received during normal transactions, and in particular the multi-bit acknowledgement signal received as part of those slave transfers.

By such an approach, the complexity of the slave device can be significantly reduced, since the master device provides circuitry necessary to determine a slave clock replica, and the slave device merely communicates over the interface as though the interface is synchronised with the slave clock signal. Further, by decoupling the frequency estimate from the phase estimate, a reliable slave clock can be generated without adversely impacting the performance of the interface.

In one embodiment, the multi-bit acknowledgement signal 260 is used not only to guarantee the provision of an edge from the which the phase estimator can update the phase of the slave clock, but also uses the direction of the edge transition to identify whether the slave has correctly received the master transfer being acknowledged or not. In particular, as shown in FIG. 3, in one example embodiment a positive transition 265 from the logic zero to the logic one state can be used to identify that the master transfer being acknowledged has been received correctly, whilst a negative transition from the logic one value to the logic zero value 270 can be used to identify that the master transfer has not been acknowledged correctly. As will be appreciated by those skilled in the art, other mechanisms can be used to communicate to the master whether the slave has correctly received a packet. As will be appreciated by those skilled in the art, the slave transmit/receive controller 35 can use a number of known mechanisms for determining whether the master transfer has been received correctly, and for example may use a CRC mechanism, a parity check, or other error detection checking mechanisms in order to determine whether the master transfer has been received correctly. Based on this determination, the multi-bit acknowledgement signal 260 can be set accordingly.

In the event of the NACK signal being received by the master transmit/receive controller 10, indicating that the previous master transfer has not been received correctly, the master transmit/receive controller can be arranged to merely resend that master transfer. However, this time around, the slave clock replica will have been adjusted by virtue of the revised phase estimate produced by the phase estimator 60 based on the falling edge 270 of the NACK signal. Hence, this increases the chance that when the master transfer is resent, it will be received correctly by the slave device.

One key advantage of the above described approach is that when the interface is heavily loaded, the synchronisation overheads diminish, since the high levels of traffic on the bus are used to regularly update the phase of the replica clock generated by the master.

Figure 2:
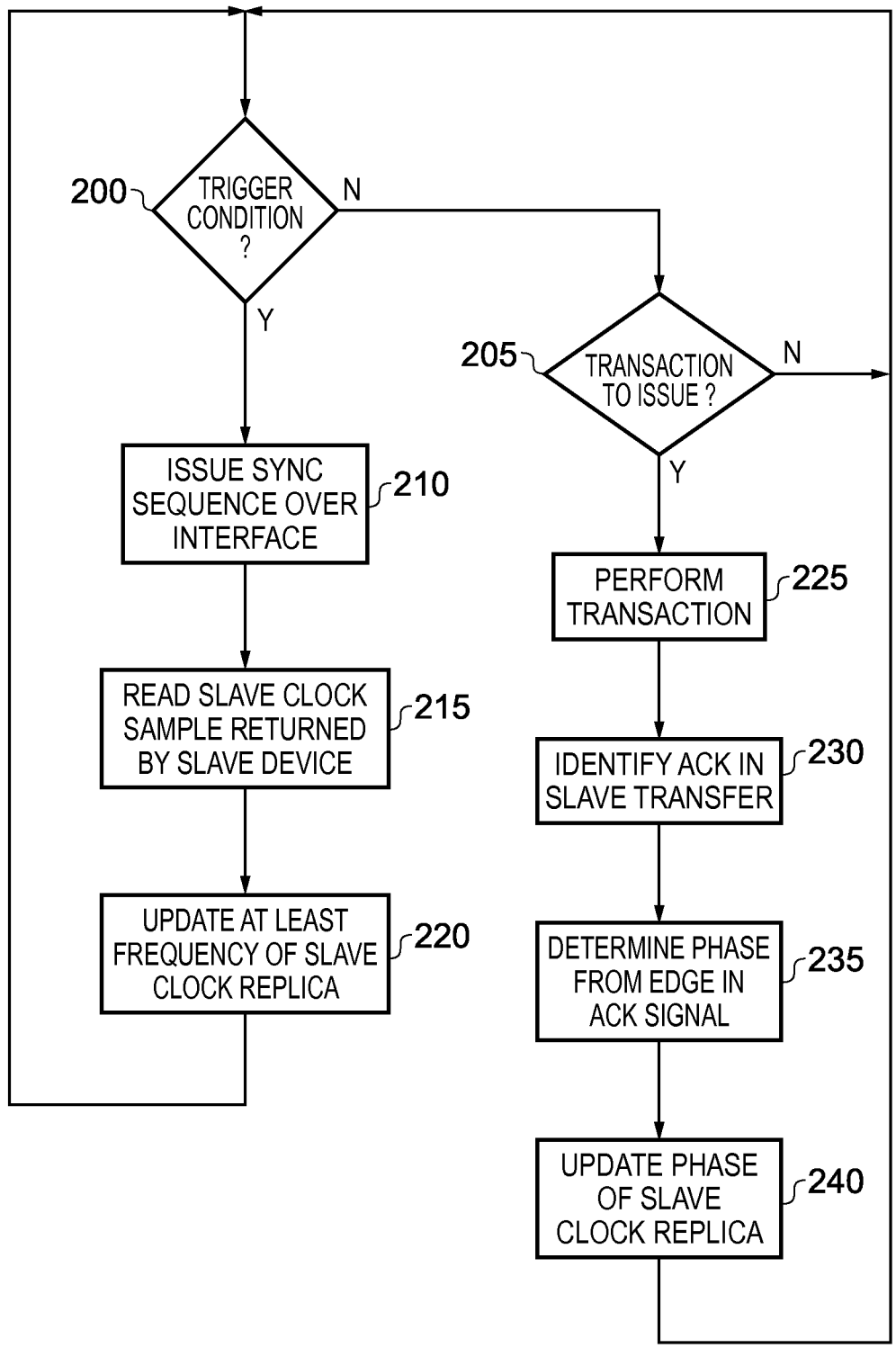
FIG. 2 is a flow diagram illustrating the basic mechanism employed by the apparatus of FIG. 1 to enable the master device to maintain an estimate of the frequency and the phase of the slave clock signal in accordance with one embodiment.

FIG. 2 is a flow diagram illustrating the basic operation of the apparatus of FIG. 1 in order to update the frequency estimate and the phase estimate of the slave clock. At step 200, it is determined whether a trigger condition has arisen. As discussed earlier, the trigger condition can take a variety of forms, for example a boot of the system, the elapse of a predetermined period since the last trigger condition, the bit error rate (BER) exceeding a predetermined level (as monitored by the link quality monitor 27), etc. It could further occur, for example, if the system had been idle for longer than a predetermined period. However, in an alternative embodiment the master transmit/receive controller 10 can merely be arranged to issue dummy read transfers over the interface during the idle period, so that the acknowledgement signals returned can be used to update the phase estimate during the idle period.

Assuming the trigger condition is detected, then the sync generator 25 is configured at step 210 to issue the sync sequence over the interface, where it is detected by the sync detector 37 and subsequently results in the clock sample generator 40 issuing a sync response transfer over the interface, the sync response transfer providing a slave clock sample which is read by the master at step 215. Thereafter, at step 220, the frequency estimator 55 is configured to determine the frequency of the slave clock replica from the slave clock sample extracted from the sync response transfer. Additionally, as discussed earlier, the phase estimator 60 may also estimate the phase of the slave clock replica from the slave clock sample determined from the sync response transfer. Thereafter the process returns to step 200.

In the absence of the trigger condition, the process proceeds to step 205, where it is determined whether there is a transaction for the master device to issue. If there is, then at step 225 that transaction is performed, as discussed earlier this involving at least one master transfer from the master device to the slave device, and at least one slave transfer from the slave device back to the master device. At step 230, the acknowledgement portion of each slave transfer is identified, and at step 235, the phase estimator 60 is then configured to determine the current phase of the slave clock from at least one edge present in the acknowledgement signal. The phase determined at step 235 is then used at step 240 to update the phase of the slave clock replica, whereafter the process returns to step 200.

Figure 4:
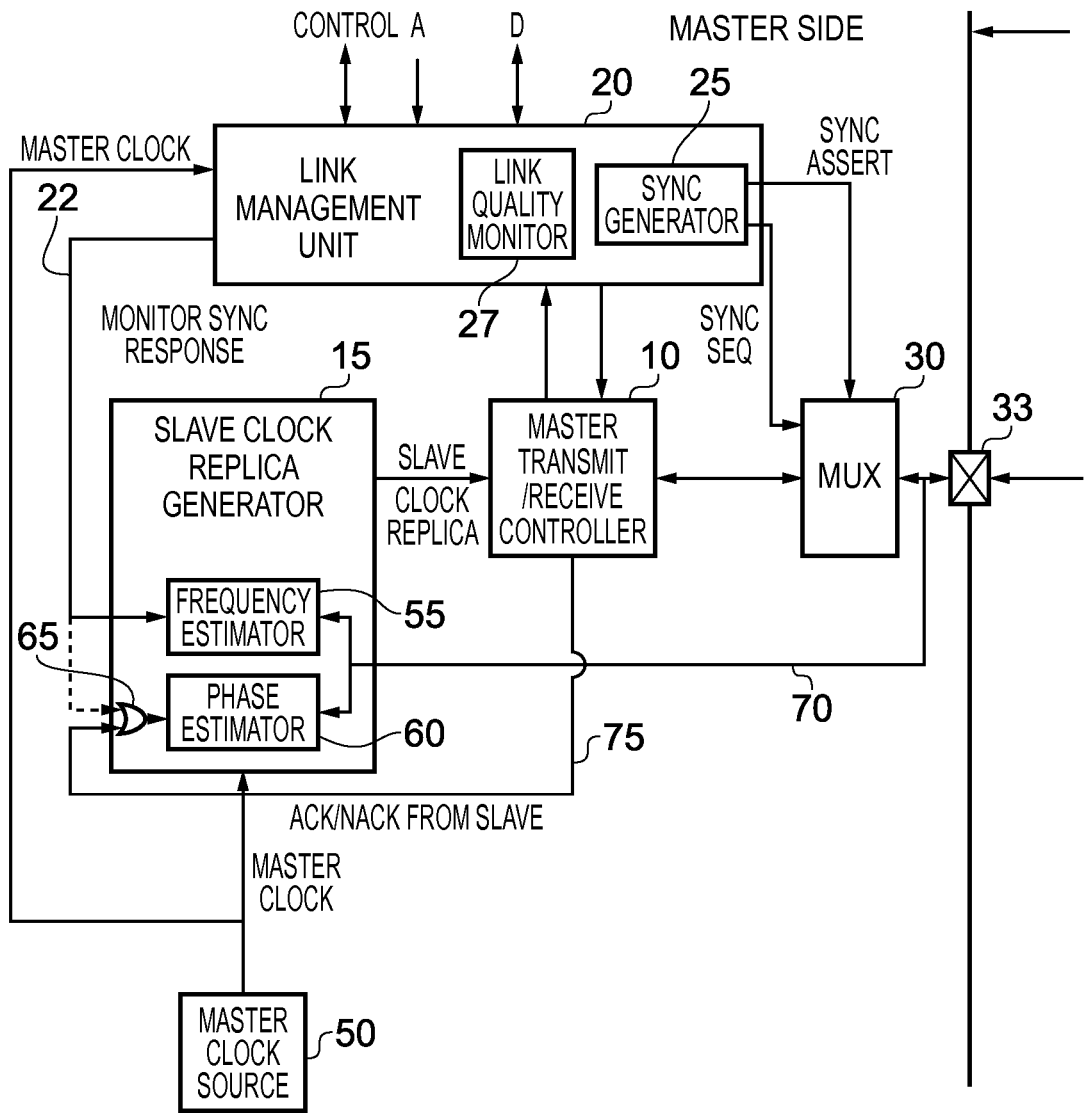
FIG. 4 is a block diagram of a data processing apparatus in accordance with an alternative embodiment.
Figure 4:
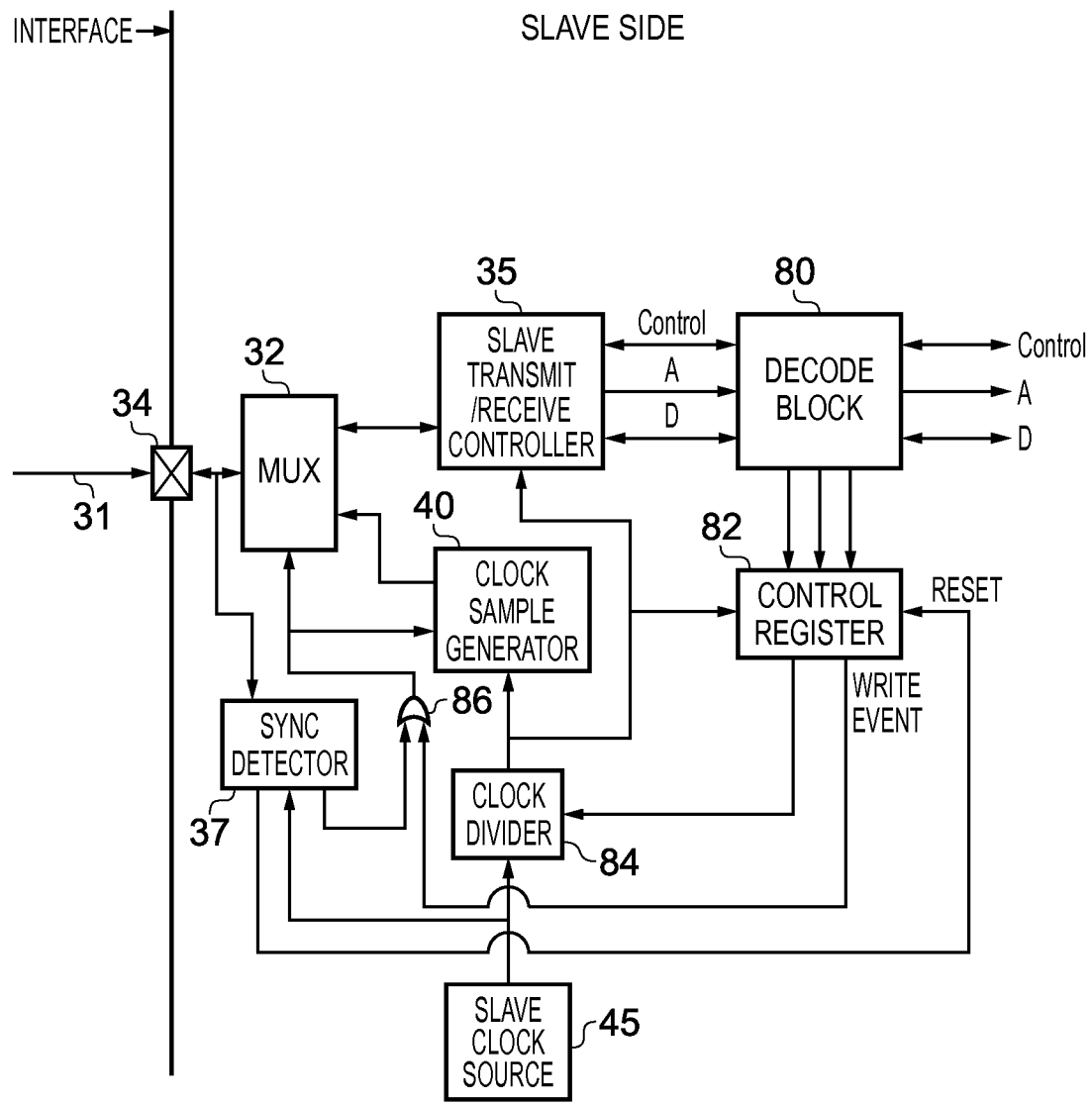

FIG. 4 illustrates an alternative apparatus to that described earlier with reference to FIG. 1, where the slave clock frequency may be altered in response to a modification command issued by the master device, with the aim of increasing the speed of the interface in situations where the quality of the slave clock is determined to support such an increase. Those elements which are unchanged from the embodiment of FIG. 1 are identified using the same reference numerals. As will be apparent, the basic structure of the master device is unchanged, other than the link management unit 20 being able to cause the master transmit/receive controller 10 to issue modification commands over the interface as and when it is determined appropriate to change the frequency of the slave clock.

Within the slave device, a clock divider 84 is provided which is controlled by the current value stored within a control register 82. Whilst the sync detector 37 is controlled by the unamended slave clock signal output by the slave clock source 45, the output from the clock divider 84 is used to control the clock sample generator 40, the slave transmit/receive controller 35 and clocking of the control register 82.

Whilst the modification command issued by the master device to cause a change in the slave clock frequency can take a variety of forms, in one embodiment the modification command is issued by the master device initiating a write transaction over the interface to write an updated value into the control register 82. As each write transfer is received by the slave transmit/receive controller 35, the relevant control, address and data information is forwarded onto the decode block 80, which is used to decode that information in order to decide what entity is being accessed by the transaction. When the address identifies the control register 82, it will cause the necessary control, address and data information to be issued to the control register 82 to cause the current value stored in the control register to be updated.

Once the value is updated, this updated value will be provided to the clock divider 84, whose output will then depend on the updated value. In addition, whenever the control register is written to, a write event signal is issued from the control register 82 via the OR gate 86 to the multiplexer 32 and the clock sample generator 40, causing the multiplexer 32 to select the output from the clock sample generator 40, and causing the clock sample generator 40 to issue a sync response transfer based on the newly updated clock frequency output by the clock divider 84. This sync response transfer will be processed in the normal way by the slave clock replica generator 15 in order to update the frequency of the slave clock replica (and also optionally the phase).

The above described approach enables the link management unit 20 to decide to increase the speed of the slave clock in order to seek to increase the speed of the interface, and this can be done in a variety of situations, for example when the link quality monitor 27 indicates that the bit error rate is currently low, and hence it appears that an increase in the speed of operation can be tolerated. However, a mechanism is required to backtrack from the increased frequency if use of the increased frequency actually gives rise to a problem, for example a sudden increase in the bit error rate that is preventing packets from being correctly received. However, it is not sufficient to rely on the issue of a modification command to set a value in the control register which will cause the clock frequency to be reduced, since it may be that that modification command cannot be correctly received by the slave transmit/receive controller at the current elevated frequency, and accordingly the update to the control register will not take place.

In order to address this issue, in one embodiment whenever the sync generator generates a sync sequence which is then detected by the sync detector 37, the sync detector issues a signal to the control register to cause the value to be updated in a way which decreases the clock frequency output by the clock divider 84, prior to the sync response transfer being issued by the clock sample generator 40. In one embodiment, the sync detector may merely issue a reset signal which causes the control register to be reset to an initialised value, i.e. a predetermined low frequency. Alternatively, the signal from the sync detector may cause the current value of the control register to be updated by a predetermined amount, so as to reduce the clock frequency by a predetermined amount from its current value. In such situations, if the bit error rate is still unduly high, a further sync sequence can be issued to cause a further reduction in the slave clock frequency, and at some point a slave clock frequency will be reached at which correct communication can again take place via the interface.

Figure 5:
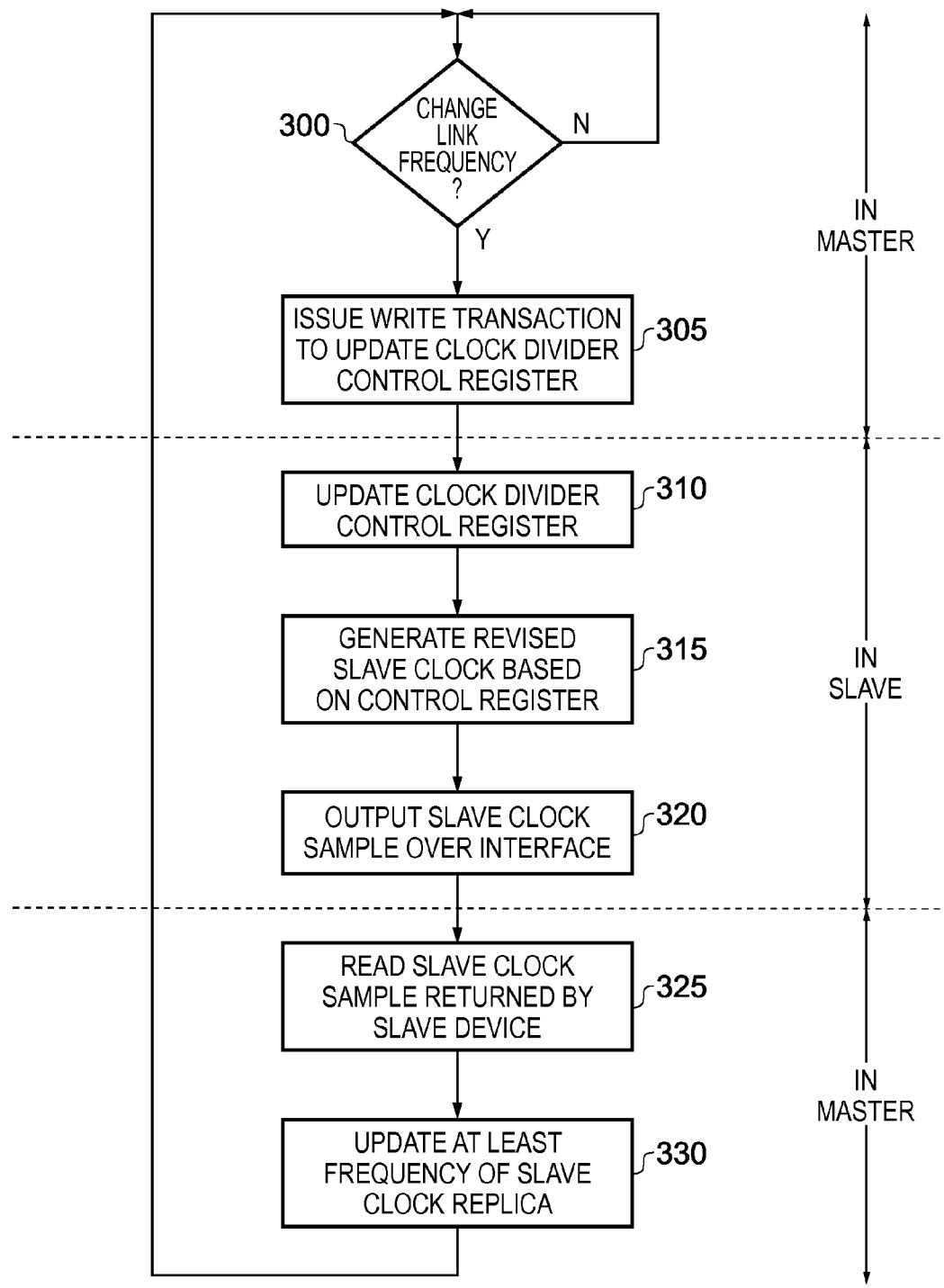
FIG. 5 is a flow diagram illustrating the process performed by the apparatus of FIG. 4 when seeking to change the link frequency for transfers across the interface in accordance with one embodiment.

FIG. 5 is a flow diagram illustrating the operation of the apparatus of FIG. 4 when seeking to change the link frequency of the interface. At step 300, the link management unit 20 determines whether it is appropriate to change the link frequency, for example with reference to the data maintained by the link quality monitor 27. If it is, then it issues a write transaction via the interface at step 305, in order to update the value stored in the clock divider control register 82. Within the slave device, this causes the control register to be updated at step 310, and then at step 315 the clock divider 84 generates a revised slave clock based on the current control register value. Thereafter, at step 320, the clock sample generator 40 outputs a sync response transfer providing a slave clock sample, which is sent over the interface for receipt by the slave clock replica generator 15 within the master device.

At step 325, the slave clock replica generator 15 determines the slave clock sample contained within the sync response transfer, and then at step 330 updates at least the frequency of the slave clock replica based on the read slave clock sample. Thereafter, the process returns to step 300.

Figure 6:
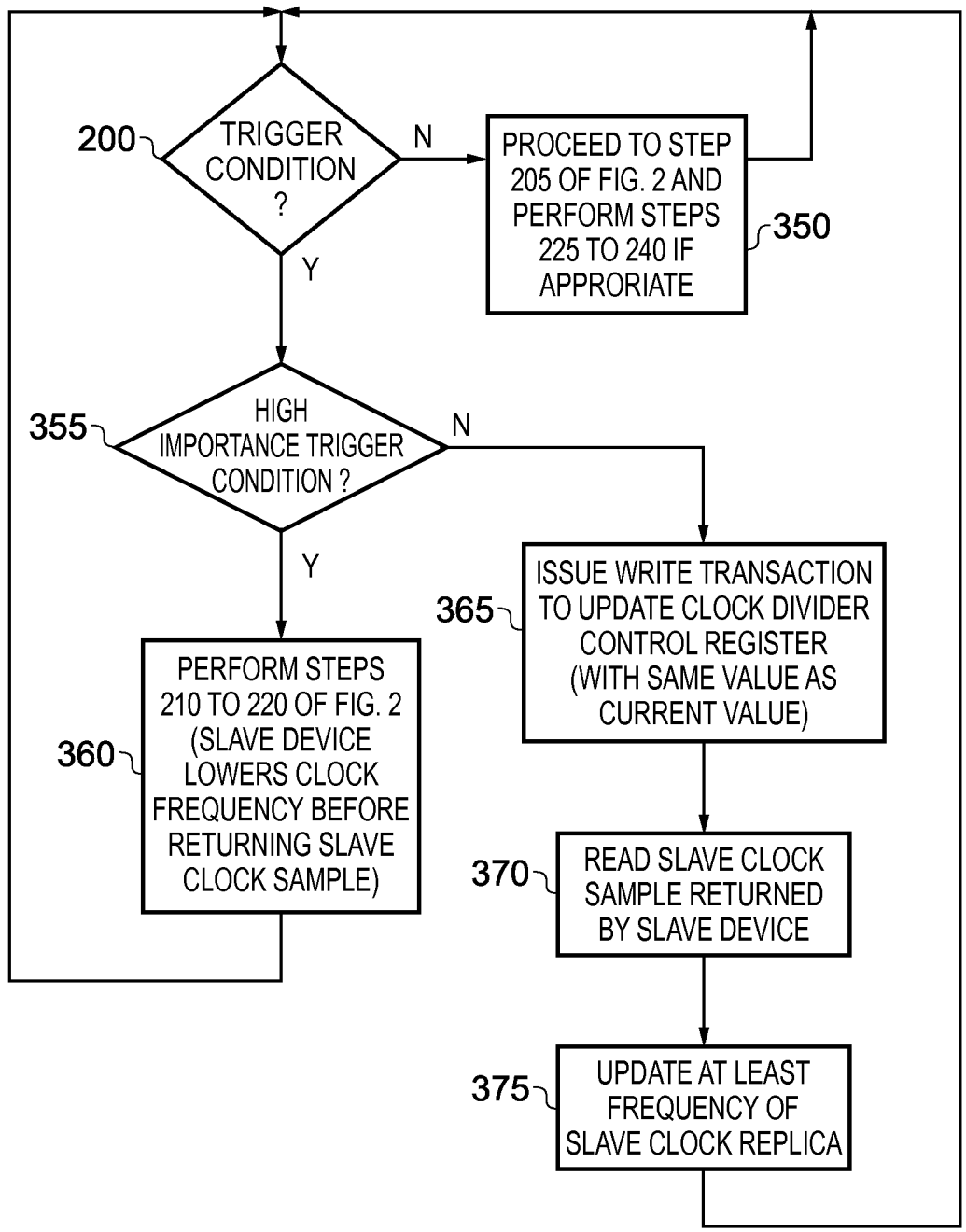
FIG. 6 is a flow diagram illustrating how the process of FIG. 2 may be modified when utilising the apparatus of FIG. 4 in accordance with one embodiment.

FIG. 6 is a flow diagram illustrating how the apparatus of FIG. 4 uses a combination of modification commands and sync sequences to modify the frequency of the slave clock. At step 200, it is determined whether a trigger condition has been detected, this trigger condition being any of the trigger conditions discussed earlier for step 200 when describing FIG. 2. If a trigger condition is not detected, then at step 350 the process proceeds to step 205 of FIG. 2, whereafter steps 225 to 240 of FIG. 2 are performed if appropriate. For more details, the reader is referred to the earlier description of FIG. 2.

If at step 200 the trigger condition is detected, then at step 355 it is determined whether the trigger is a high importance trigger condition, i.e. one that is affecting the ability of the interface to be used for correct communication between the master and the slave device. An example of an important trigger condition may be when the system is first booted up, or if the bit error rate has exceeded some predetermined high level indicative of a potential failure in communication across the interface due to the frequency being used for communication across the interface. In the case of such a high importance trigger condition, the process proceeds to step 360, where steps 210 to 220 of FIG. 2 are performed. However, when these steps are performed in association with the apparatus of FIG. 4, then, as discussed earlier, on detection of the sync sequence by the sync detector 37, the value of the control register is updated in order to cause the clock frequency output by the clock divider to be reduced, prior to a slave clock sample being output by the clock sample generator 40 back to the master device. This hence enables the apparatus to recover from a situation where a previously set frequency for the slave clock signal, and hence for communications over the interface, has resulted in a failure of communication across the interface.

Assuming there is a trigger condition at step 200, but that trigger condition is not considered to be a high importance trigger condition at step 355, then it is determined that all that is required is a sync response transfer in order to update the frequency estimate, but no change in the clock frequency is required. Since as discussed earlier issuance of a sync sequence by the sync generator will cause the clock frequency to be reduced, then that mechanism cannot be used for this purpose. Instead, as illustrated by step 365 of FIG. 6, the link management unit 20 causes the master transmit/receive controller 10 to issue a write transaction to update the clock divider control register 82. However, in this instance, the register is updated with the same value as the current value. This still triggers a write event which causes the clock sample generator 40 to generate a sync response transfer, but in this instance the output from the clock divider is unchanged, and accordingly the clock sample generator merely produces a sample of the current clock frequency. This slave clock sample as returned by the slave device is read by the slave clock replica generator 15 at step 370, whereafter at least the frequency of the slave clock replica is then updated at step 375. Thereafter, the process returns to step 200.

Figure 7:
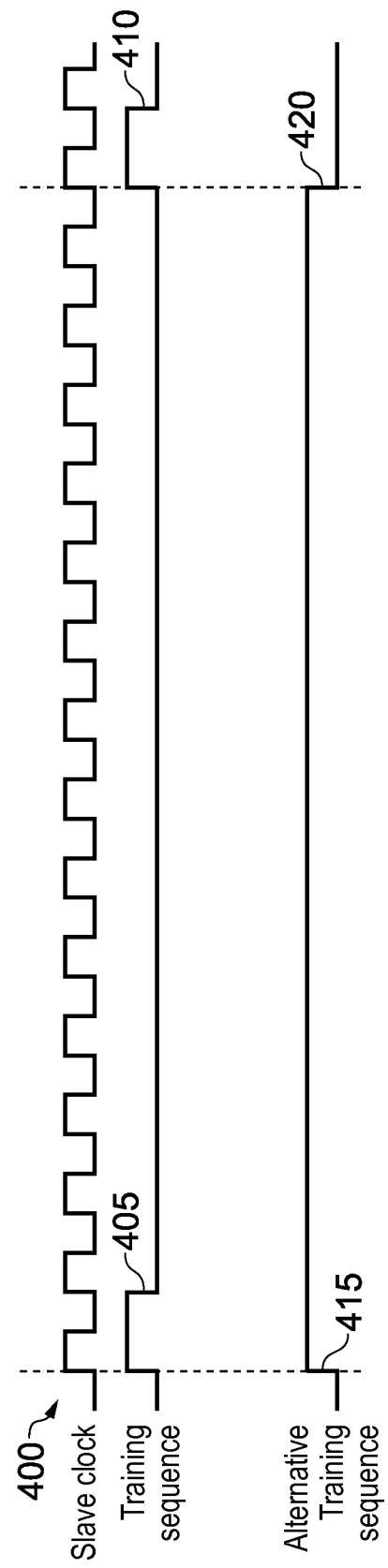
FIG. 7 is a timing diagram illustrating two alternative training sequences that can be provided in the sync response transfers returned from the slave device to the master device in response to a sync request transfer from the master device, in accordance with one embodiment.

The sync response transfer issued by the clock sample generator 40 can take a variety of forms, and two example formats are shown in FIG. 7. As shown, for a first example format, if the slave clock has the form 400, then the clock sample generator 40 is arranged to generate a first pulse 405, and then after a predetermined number of slave clock cycles has elapsed, is arranged to generate a further pulse 410. The frequency estimator 55 within the slave clock replica generator 15 detects the presence of both pulses, and based on a knowledge of the predetermined number of slave clock cycles that have elapsed between the two pulses, is thereby able to calculate a current frequency estimate.

As also shown in FIG. 7, an alternative approach causes a rising edge transition 415 to occur on the rising edge of a first slave clock cycle, and then a falling edge transition 420 to occur on the rising edge of a subsequent slave clock cycle a predetermined number of clock cycles after the first clock cycle. Again, the frequency estimator 55 will detect both the transition 415 and the transition 420, and based on the knowledge of the number of slave clock cycles that has elapsed between those two edges, can determine the slave clock frequency. Since the clock sample generator 40 is called upon to generate a sync response transfer relatively infrequently, then the training sequence provided as the sync response transfer can be relatively long (i.e. many slave clock cycles can be included between the start pulse/edge and the end pulse/edge, thereby increasing the accuracy of the frequency estimation that can be determined by the frequency estimator 55.

Figure 8:
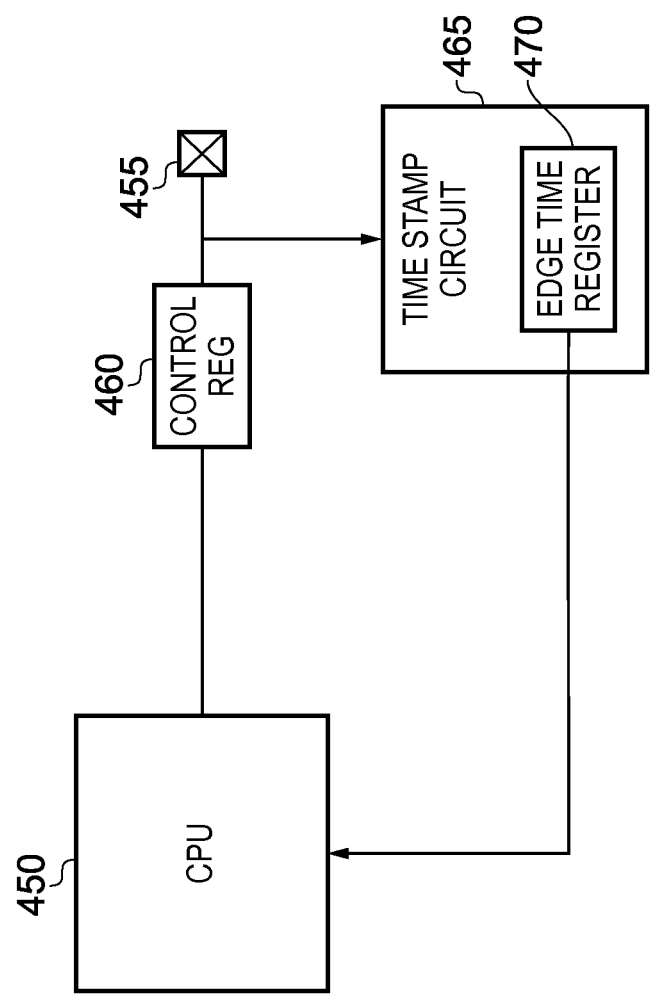
FIG. 8 illustrates how time stamp circuitry within the master device may be used to capture the training sequence in accordance with one embodiment.

Further, by using training sequences such as those shown in FIG. 7, rather than merely outputting the slave clock signal, this enables a significant reduction in the number of edges that needs to be detected by the frequency estimator, and this in turn enables a significant reduction in the cost and complexity of the components provided within the master device to provide the frequency estimation. For example, by using such a low number of edges, it is possible to produce a low cost/low performance master by using oversampling techniques in software to evaluate the edges. Alternatively, a low cost/low performance microcontroller can use existing time stamping hardware typically found in the general purpose input/output (GPIO) interface to accurately capture information about the slave clock without requiring significant computation. Such an approach is shown in FIG. 8 where a CPU 450 of the microcontroller is coupled to a control register 460 which can be set to a logic zero value in order to transmit a logic zero value from the pin 455, to a logic one value in order to output a logic one value from the pin 455, or can be set to a tristate value when the master pin 455 is configured to receive an input, i.e. a slave transfer from a slave device. Any such input can also be routed to the time stamp circuit 465, which will include an edge time register 470. Considering the training sequences of FIG. 7, when the first pulse/edge is received, the edge time register 470 can capture the time of receipt of that edge, whereafter the CPU 450 can read that value from the edge time register prior to the end pulse/edge being received. When the edge pulse/edge is received, then the edge time register 470 will overwrite its previously stored time value with the time of receipt of the end pulse/edge, and the CPU can subsequently read that value out of the edge time register in order to be provided with an accurate timing indication for both the start pulse/edge and the end pulse/edge. Thereafter, the CPU 450 can deduce the slave clock frequency based on its knowledge of the number of slave clock cycles occurring between the start pulse/edge and the end pulse/edge.

Figure 9:
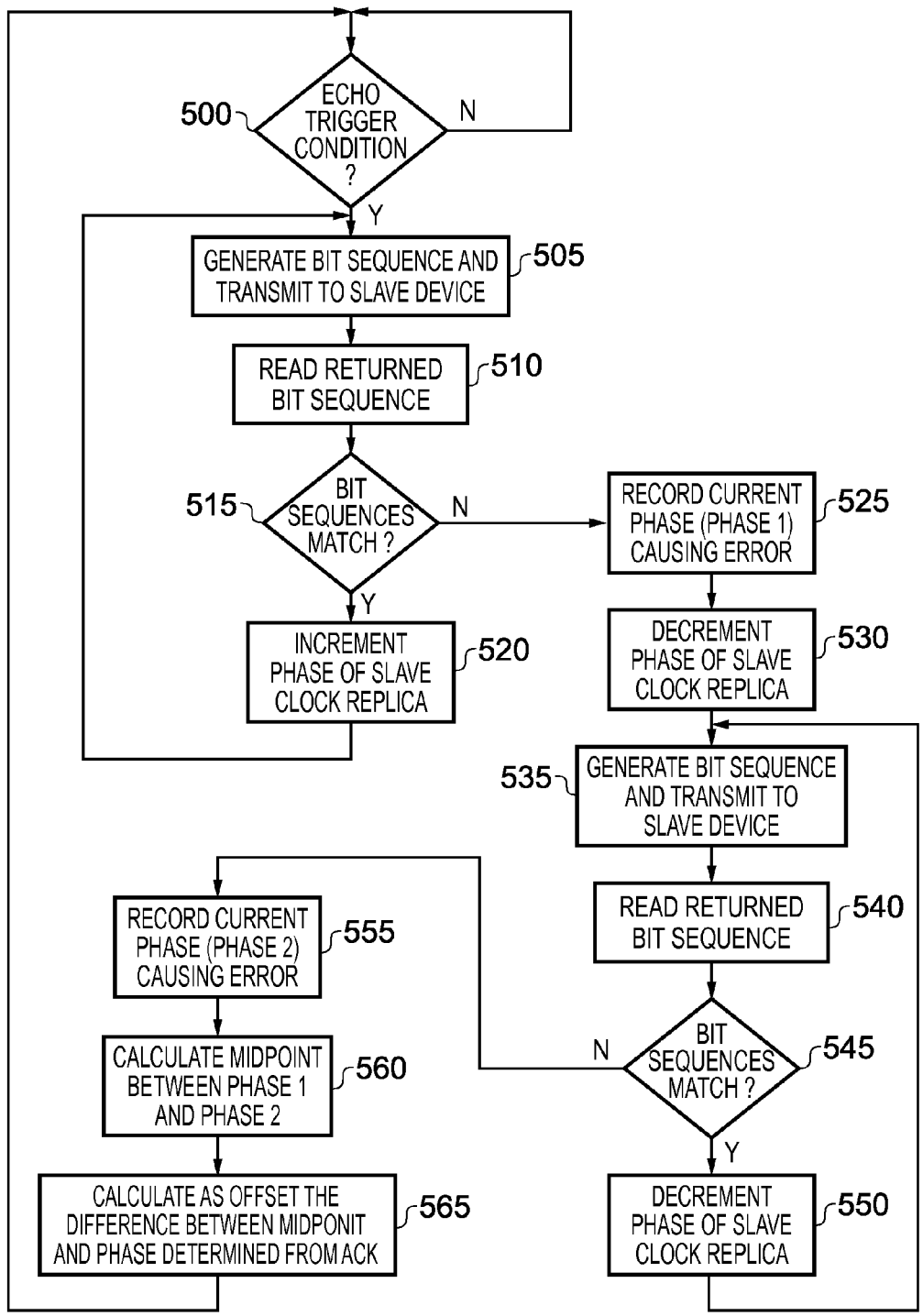
FIG. 9 is a flow diagram illustrating the process performed to implement an echo feature in accordance with one embodiment.

FIG. 9 is a flow diagram illustrating a further enhancement of the communication protocol where an echo feature is used to cause the slave device to transmit back to the master a copy of a bit pattern that is has sampled from the master. This allows the master device to see the data as it was sampled by the slave's internal clock, including any errors introduced by sampling the data in the wrong place. By looking at the clock phases where errors are generated, the master device can obtain a more accurate estimate of the phase of the slave's internal clock than would otherwise be possible from merely relying upon the evaluation of the phase from the sample of the clock transmitted back by the slave. This is due to the fact that the sample of the clock transmitted from the slave device is delayed by the output pad in the slave, the wire that interconnects the master and slave devices, and the input pad in the master. In some embodiments, such as where relatively low clock frequencies are used across the interface, and the delays are relatively small, such delays do not cause any operational problems. Further, in some embodiments, the delays can be predetermined and used to provide an offset used by the phase estimator 60 when calculating the phase of the slave clock replica. However, in other instances where the delays are significant and/or may vary over time, the process of FIG. 9 can be used to enable the slave clock replica generator 15 to determine a suitable offset.

At step 500, it is determined whether an echo trigger condition has been detected. This trigger condition can take a variety of forms, for example the trigger may be detected when the system is first booted up, or when the BER exceeds a predetermined value. As a further example, the echo trigger condition may arise in periods where the system is idle, so that the available bandwidth of the interface can be used to update the phase offset without impacting performance.

On detection of the echo trigger condition, the link management unit 20 causes the master transmit/receive controller 10 to generate a master transfer containing a bit sequence which is then transmitted to the slave device via the interface at step 505. This causes the slave transmit/receive controller 35 to sample that bit sequence, and then to return the sampled bit sequence via the interface to the master transmit/receive controller 10. This process can be achieved by a single transaction in some embodiments, but in an alternative embodiment a pair of transactions can be used, one to write the bit sequence into a predetermined register of the slave device, and another to then read that bit sequence back from the register of the slave device.

In any event, when the returned bit sequence is read by the master transmit/receive controller 10 at step 510, it is then determined whether the bit sequences match at step 515. If so, then the phase of the slave clock replica is incremented at step 520, and the process returns to step 505.

If on the first iteration through steps 505, 510 and 515, the bit sequences did not match, then the lack of a match is in one embodiment ignored for a number of iterations until the first match is detected, and the process proceeds to step 520 where the phase of the slave clock replica is incremented. In particular, it is desired to capture a transition from a situation where the bit sequences are matching to a situation where they no longer match.

Accordingly, at some point during iteration of the loop between steps 505 and step 520, a situation will be detected where the bit sequences no longer match, and at this point the process proceeds to step 525 where the current phase (hereafter referred to as "phase 1") that is causing the error is recorded. Thereafter, at step 530 an initial decrement of the phase of the slave clock replica is performed. At this point, the phase could merely be adjusted back to the initial phase at which the very first bit sequence was generated at step 505. Alternatively, at step 530 the phase may merely be decremented by some predetermined amount from its current value that caused an error.

Thereafter, at step 530, a bit sequence is generated and transmitted to the slave device, whereafter at step 540 the returned bit sequence as sampled by the slave device is then read by the master device. At step 545, it is determined whether the bit sequences match. As with step 515, if the bit sequences do not match on the very first iteration through step 545, then that lack of a match can be ignored in some embodiments.

If the bit sequences match, then the phase of the slave clock replica is decremented at step 550, and the process returns to step 535. At some point during iteration of the steps 535 to 550, the bit sequences will no longer match at step 545, and at this point the process proceeds to step 555 where the current phase (hereafter referred to as "phase 2") that is causing the error is recorded.

At this point, the master device then knows a point at which incrementing of the phase causes an error (phase 1) and a point at which decrementing of the phase causes an error (phase 2). Accordingly, at step 560, a midpoint between phase 1 and phase 2 can be calculated, this being indicative of the actual phase of the slave clock signal. Thereafter, at step 565, the slave clock replica generator 15 calculates as a phase offset the difference between that midpoint value calculated at step 560 and the phase as most recently determined by the phase estimator 60. This phase offset can then be applied to any subsequent phase determined by the phase estimator 60 in order to more accurately represent the phase of the slave device, and in particular to offset for any time delays introduced by communication of the signal over the interface.

In the description thus far, it is assumed that the master device is communicating with a single slave device. If the master device is in fact configured so that it can communicate with multiple slave devices, then the above described configuration of the master device can be replicated for each communication path between the master device and one of the slave devices. However, this would be a somewhat costly approach to adopt. As another alternative, the master device does not include any such replicated components, and instead a system reset occurs each time the master device switches from one slave device to another slave device, causing the sync sequence to be issued by the sync generator, and the frequency and phase estimate for the slave clock of the slave device being switched to to be calculated. However, such an approach has an adverse impact on performance. However, in accordance with the embodiment shown in FIG. 10, a more efficient approach can be adopted which provides improved performance compared with such a reset approach.

Figure 10:
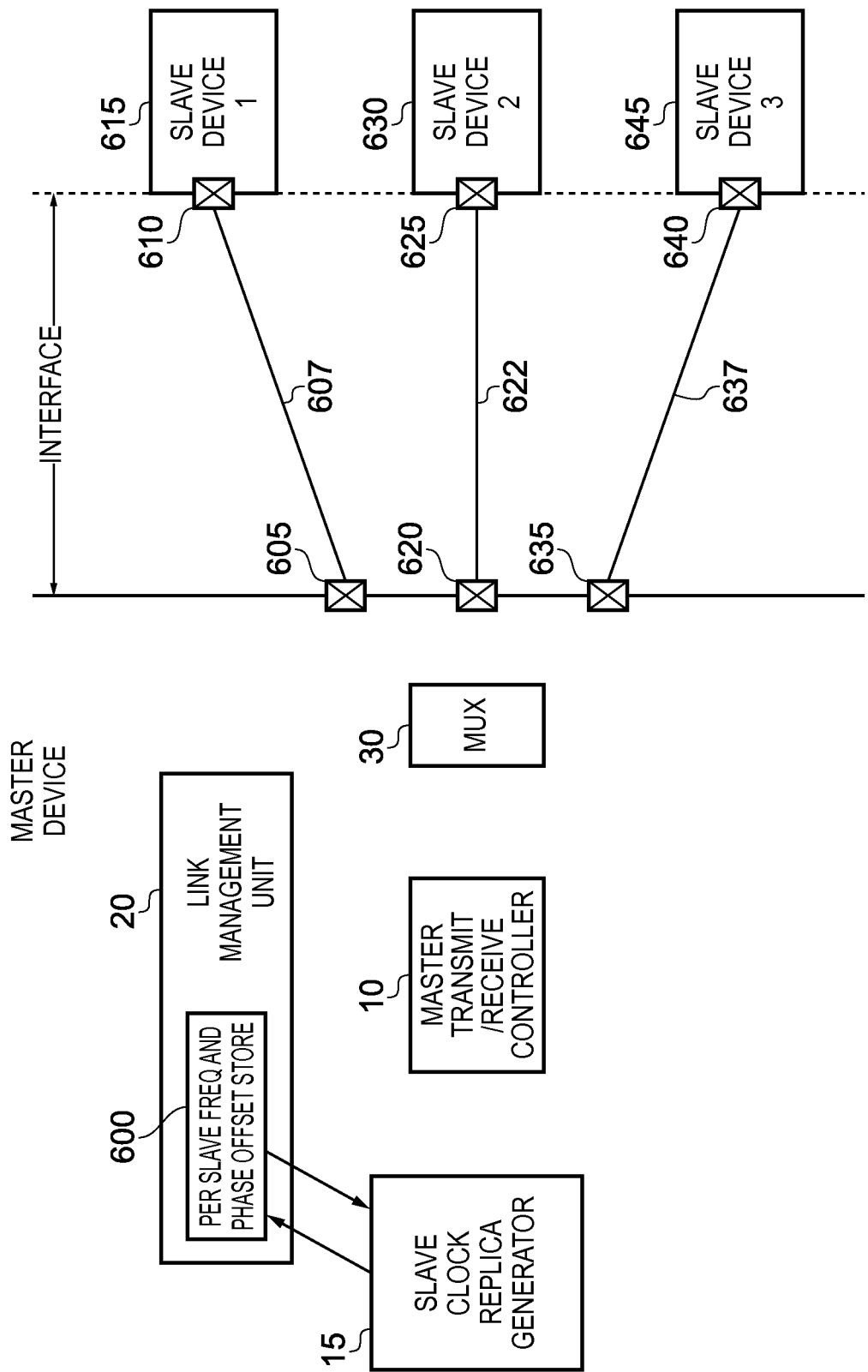
FIG. 10 is a diagram illustrating how the master device may be coupled with a plurality of slave devices in accordance with one embodiment.

In particular, as shown in FIG. 10 the interface provides three communication paths 607, 622, 637 between respective master pins 605, 620, 635 and associated slave pins 610, 625, 640 provided on slave devices 615, 630, 645. Within the link management unit 20, a storage 600 is provided for retaining a copy of the latest frequency estimate (and optionally the most recent phase offset if the approach of FIG. 9 is used) for a current slave device at the time the master switches from communicating with that current slave device to communicating with a different slave device. When the master device subsequently switches back to communication with that (previously current) slave device, then the frequency and phase offset can be read from the storage 600 back into the slave clock replica generator 15 to provide a starting point for communication between the master device and that slave device. Since the frequency and phase offset information will typically vary very slowly, the stored frequency and slave offset information can still provide a reliable indication of the frequency and the slave offset to use at this point.

It is likely however that the absolute phase of the slave clock signal will have changed in the intervening time, and accordingly the slave clock replica generator 15 will not have a suitable phase estimate to use for the first transmission. However, the phase estimate can be chosen arbitrarily, and when the master transfer is sent over the relevant link to the slave device, in all likelihood the slave device will not receive that master transfer correctly, and will send a slave transfer back to the master device whose multi-bit acknowledgement signal identifies that the master transfer was not received correctly. Nevertheless, the edge transition in that multi-bit acknowledgement signal can be used to produce a revised estimate of the phase, whereafter transmission of the master transfer can be re-attempted using the updated slave clock replica. There is a high likelihood at this point that the master transfer will then be received correctly. Only if the master transfer continues to not be received correctly despite the phase adjustment will it then be necessary to issue the sync sequence, and analyse the sync response transfer before attempting to retransmit the master transfer. Hence, the approach of FIG. 10 strikes a useful balance between replication of circuitry to maximise performance, and having to reset every time the master switches to a different slave device which could significantly impact performance.

Although particular embodiments have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
   a master device configured to operate from a master clock signal;
   an interface between said master device and a slave device configured to operate from a slave clock signal asynchronous to said master clock signal, the interface providing a communication path for the transfer of packets between the master device and the slave device, each packet comprising a plurality of bits;
   the master device being configured to initiate transactions, each transaction comprising a plurality of transfers including a master transfer to transmit a packet from the master device to the slave device and a slave transfer to transmit a packet from the slave device to the master device;
   the master device including a slave clock replica generator configured to generate a slave clock replica used to control timing of transmission of packets by the master device over the interface, and to control timing of reception by the master device of packets sent by the slave device over the interface;
   the master device including control circuitry configured in response to a predetermined trigger condition to cause a sync request transfer to be issued over said interface from the master device to the slave device, the sync request transfer having a property identifiable by the slave device irrespective of whether the sync request transfer is synchronised with the slave clock signal;
   the slave clock replica generator being configured to determine at least the frequency of the slave clock replica from a sync response transfer received over the interface from the slave device, the sync response transfer being issued in response to detection of said sync request transfer by the slave device, and being indicative of at least a frequency of the slave clock signal; and
   the slave clock replica generator further being configured to reference at least a portion of the packet of selected slave transfers to determine a phase of the slave clock replica, said at least a portion of the packet containing at least one transition between a first value and a second value different to said first value;
   whereby the determination of the phase of the slave clock replica is decoupled from the determination of the frequency of the slave clock replica.

2. A data processing apparatus as claimed in claim 1, wherein the predetermined trigger condition is set such that, aggregated over time, the slave clock replica generator receives said selected slave transfers more frequently than said sync response transfers.

3. A data processing apparatus as claimed in claim 1, wherein said selected slave transfers comprise at least one slave transfer of each transaction.

4. A data processing apparatus as claimed in claim 1, wherein said property of the sync request transfer identifiable by the slave device comprises assertion of said sync request transfer at a fixed value for a duration exceeding a maximum duration that is allowable within a packet of a master transfer.

5. A data processing apparatus as claimed in claim 4, wherein the control circuitry is configured to determine said maximum duration with reference to a predetermined maximum packet size of a master transfer and a predetermined minimum clock frequency for said slave clock signal.

6. A data processing apparatus as claimed in claim 1, wherein the portion of the packet of selected slave transfers comprises a multi-bit response, said multi-bit response from the slave device always including a transition between the first value and the second value.

7. A data processing apparatus as claimed in claim 6, wherein:
   the multi-bit response is such that the master device can determine whether the slave device correctly received a master transfer;
   the master device being responsive to detection of the multi-bit response indicating incorrect reception of the master transfer by the slave device to resend the associated master transfer with its timing of transmission determined in accordance with the slave clock replica as updated by the phase determined by the slave clock replica generator from the incorrect reception indicating multi-bit response.

8. A data processing apparatus as claimed in claim 1, further comprising said slave device, wherein said slave device further comprises:
   clock modification circuitry configured to modify the frequency of the slave clock signal in response to a modification command issued by the master device.

9. A data processing apparatus as claimed in claim 8, wherein:

said slave device further comprises a control register whose stored value is referenced by the clock modification circuitry to determine the frequency of the slave clock signal; and the master device is configured to issue said modification command by initiating a write transaction over said interface to write an updated value into said control register.

10. A data processing apparatus as claimed in claim 8, wherein the slave device is responsive to said modification command to issue over said interface said sync response transfer indicative of the updated slave clock signal.

11. A data processing apparatus as claimed in claim 8, wherein the slave device is configured to be responsive to detection of said sync request transfer to lower the frequency of the slave clock signal prior to issuing over said interface the sync response transfer indicative of that lowered frequency slave clock signal.

12. A data processing apparatus as claimed in claim 1, wherein:

the sync response transfer comprises a series of edge transitions within a selected number of slave clock cycles, the number of edge transitions in said series being less than said selected number of slave clock cycles; and the slave clock replica generator is configured to apply a derivation operation to determine said at least a frequency of the slave clock replica from said sync response transfer.

13. A data processing apparatus as claimed in claim 12, wherein the sync response transfer comprises at least two edge transitions.

14. A data processing apparatus as claimed in claim 13, wherein the sync response transfer comprises four edge transitions formed as a start pulse and an end pulse, and the end pulse is issued a predetermined number of clock cycles of the slave clock signal after the start pulse is issued.

15. A data processing apparatus as claimed in claim 14, wherein the master device comprises time stamping circuitry used to record when the start pulse is received by the master device and subsequently to record when the end pulse is received by the master device.

16. A data processing apparatus as claimed in claim 1, further comprising said slave device, wherein said control circuitry is configured, in response to a predetermined echo trigger condition, to cause the master device to initiate an echo event, where a master transfer issued by the master device comprises a bit sequence, and the slave device is configured to return as the slave transfer a copy of that bit sequence as sampled by the slave device in accordance with the slave clock signal.

17. A data processing apparatus as claimed in claim 16, wherein on occurrence of the echo trigger condition, the echo event is repeated for each of a plurality of candidate phase values for the slave clock replica, and the slave clock replica generator is configured to determine a phase indication to be used when determining the slave clock replica for future transactions based on an indication of which candidates phase values result in the copy of the bit sequence as returned by the slave device not matching the bit sequence transmitted from the master device.

18. A data processing apparatus as claimed in claim 17, wherein the phase indication comprises a phase offset to be applied to the phase determined by the slave clock replica generator with reference to said at least a portion of the packet of selected slave transfers of subsequent transactions.

19. A data processing apparatus as claimed in claim 1, further comprising:

a plurality of slave devices, said plurality including said slave device, and the master device being switchable to communicate with any of said plurality of slave devices via said interface, said interface providing a separate communication path between the master device and each slave device in said plurality;

when the master device is to switch from communicating with a first slave device in said plurality to communicating with a second slave device in said plurality, the control circuitry is configured to cause at least the frequency of the slave clock replica currently used by the slave clock replica generator to be stored for subsequent reference when the master device switches back to communicating with that first slave device.

20. A method of operating a data processing apparatus comprising a master device operating from a master clock signal, and an interface between said master device and a slave device operating from a slave clock signal asynchronous to said master clock signal, the interface providing a communication path for the transfer of packets between the master device and the slave device, each packet comprising a plurality of bits, the method comprising:

initiating transactions from the master device, each transaction comprising a plurality of transfers including a master transfer to transmit a packet from the master device to the slave device and a slave transfer to transmit a packet from the slave device to the master device;

employing a slave clock replica generator to generate a slave clock replica used to control timing of transmission of packets by the master device over the interface, and to control timing of reception by the master device of packets sent by the slave device over the interface;

in response to a predetermined trigger condition, issuing a sync request transfer over said interface from the master device to the slave device, the sync request transfer having a property identifiable by the slave device irrespective of whether the sync request transfer is synchronised with the slave clock signal;

determining within the slave clock replica generator at least the frequency of the slave clock replica from a sync response transfer received over the interface from the slave device, the sync response transfer being issued in response to detection of said sync request transfer by the slave device, and being indicative of at least a frequency of the slave clock signal; and referencing at least a portion of the packet of selected slave transfers to determine within the slave clock replica generator a phase of the slave clock replica, said at least a portion of the packet containing at least one transition between a first value and a second value different to said first value;

whereby the determination of the phase of the slave clock replica is decoupled from the determination of the frequency of the slave clock replica.

* * * * *